United States Patent
Fujii et al.

(10) Patent No.: US 7,199,834 B2
(45) Date of Patent: Apr. 3, 2007

(54) VERTICAL SYNCHRONIZING SIGNAL GENERATION APPARATUS AND VIDEO SIGNAL PROCESSING APPARATUS

(75) Inventors: Kunihiko Fujii, Osaka (JP); Toshihiro Miyoshi, Osaka (JP); Kazuhide Fujimoto, Kawanishi (JP); Manabu Yumine, Kadoma (JP); Toshiya Noritake, Daito (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 705 days.

(21) Appl. No.: 10/480,235

(22) PCT Filed: Jun. 7, 2002

(86) PCT No.: PCT/JP02/05703

§ 371 (c)(1),
(2), (4) Date: Dec. 10, 2003

(87) PCT Pub. No.: WO03/003718

PCT Pub. Date: Jan. 9, 2003

(65) Prior Publication Data

US 2004/0207756 A1    Oct. 21, 2004

(30) Foreign Application Priority Data

Jun. 29, 2001    (JP) .............................. 2001-200124

(51) Int. Cl.
*H04N 5/06* (2006.01)
*H04N 5/95* (2006.01)

(52) U.S. Cl. ...................... 348/521; 348/497; 348/536; 348/547; 386/84; 386/85

(58) Field of Classification Search ................ 348/497, 348/521–525, 529, 536, 547; 386/66, 84, 386/85, 90, 121; 315/364, 370

See application file for complete search history.

(56) References Cited

U.S. PATENT DOCUMENTS

| 4,701,800 | A | * | 10/1987 | Akimoto et al. | ............... | 386/84 |
| 4,843,471 | A | * | 6/1989 | Yazawa et al. | ............. | 348/716 |
| 5,021,719 | A | * | 6/1991 | Arai et al. | ................... | 315/364 |
| 5,138,451 | A | * | 8/1992 | Shinkawa et al. | .......... | 348/524 |
| 6,721,016 | B1 | * | 4/2004 | Hamajima | ................... | 348/497 |
| 6,850,694 | B1 | * | 2/2005 | Moro et al. | ................... | 386/85 |

FOREIGN PATENT DOCUMENTS

| JP | 64-71280 | 3/1989 |
| JP | 3-067189 | 3/1991 |
| JP | 4-188960 | 7/1992 |
| JP | 6-86228 A | 3/1994 |
| JP | 10-055161 | 2/1998 |
| JP | 11-112833 | 4/1999 |
| JP | 11-155083 A | 6/1999 |
| JP | 2000-261319 A | 9/2000 |

* cited by examiner

*Primary Examiner*—Victor R. Kostak
(74) *Attorney, Agent, or Firm*—McDermott Will & Emery LLP

(57) ABSTRACT

The vertical sync signal generator includes: a vertical sync signal separation circuit for separating a vertical sync signal of an input luminance signal and outputting the separated signal as a first vertical sync signal; an automatic frequency control circuit for generating a second vertical sync signal having a repeat frequency corresponding with an average repeat frequency of the first vertical sync signal and outputting the generated signal; a vertical sync signal phase detection circuit for detecting whether or not the first vertical sync signal has two different periods repeated alternately and outputting the detection result as a decision signal; and a selector for receiving the first and second vertical sync signals, selecting the first vertical sync signal when the decision signal indicates that the first vertical sync signal has two different periods repeated alternately and otherwise selecting the second vertical sync signal and outputting the selected signal.

10 Claims, 23 Drawing Sheets

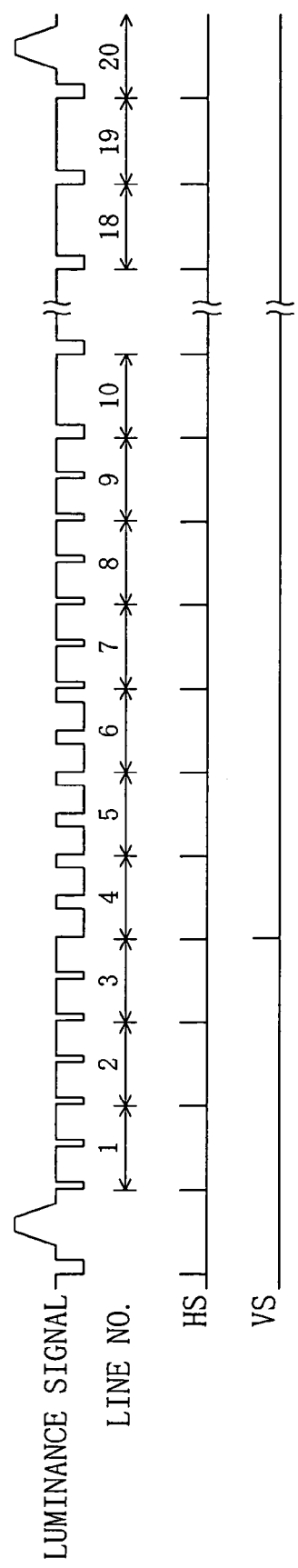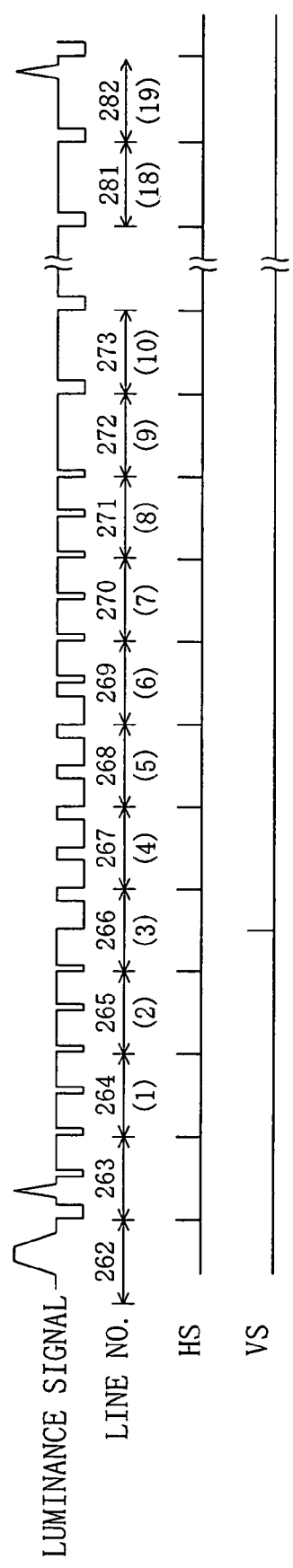

FIG. 6

| PERIOD OF VS | D1 | D2 | D3 | D4 | D5 | D6 | D7 |
|---|---|---|---|---|---|---|---|
| (1) CONSTANT | V | V | 0 | 0 | 0 | 0 | 0 |
| (2) CONSTANT(HAVING VARIATION OF SEVERAL CLOCKS) | V+α1 | V+α2 | ≒0 | ≒0 | ≒0 | ≒0 | ≒0 |
| (3) PULSE MISSING | $2^{19}-1$ | V | $2^{19}-V-1$ | $2^{19}-V-1$ | 0 | $2^{19}-V-1$ | $2^{19}-V-1$ |
| (4) 2 PERIODS(T, T') REPEATED ALTERNATELY | V+H | V | ±H | H | H | 0 | 0 |

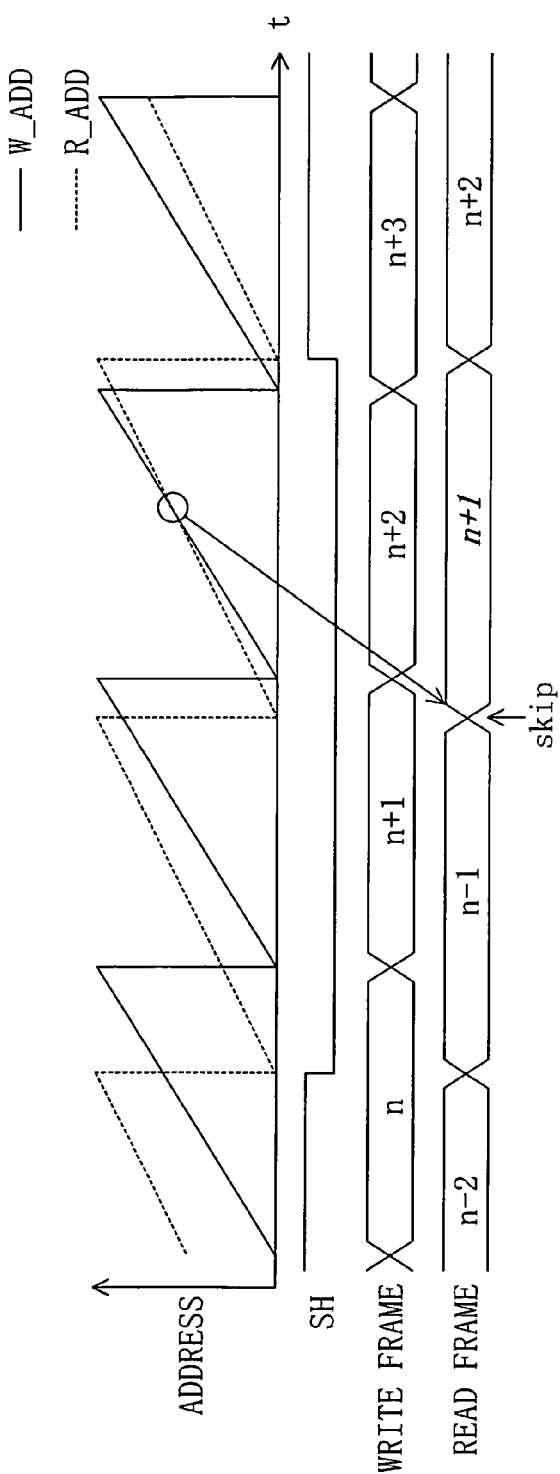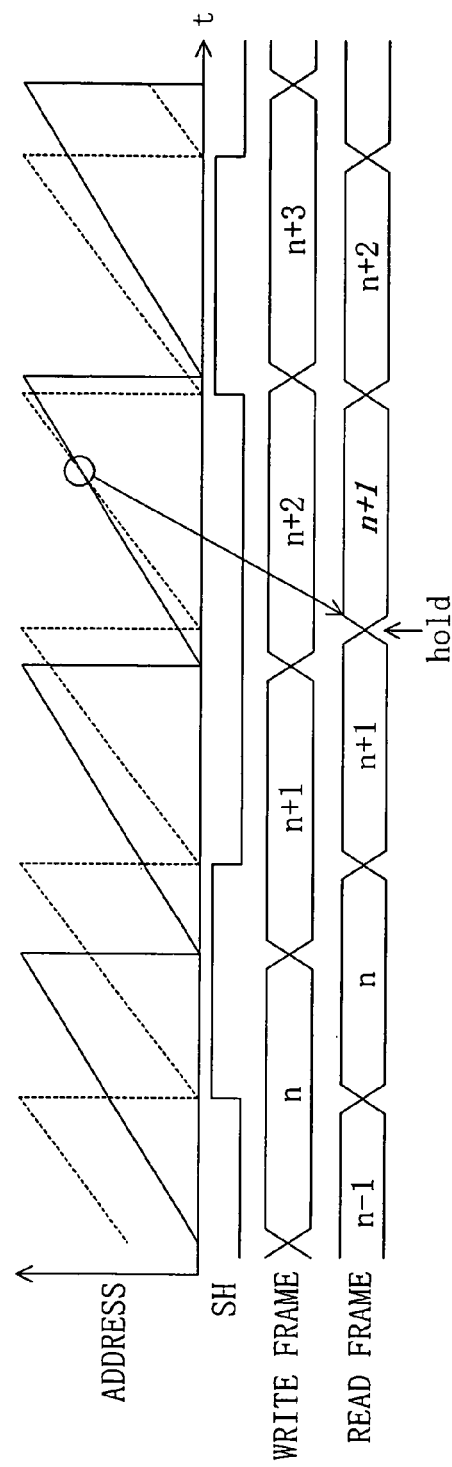

| Line No. | EAV(1) | EAV(2) | EAV(3) | EAV(4) | SAV(1) | SAV(2) | SAV(3) | SAV(4) |
|---|---|---|---|---|---|---|---|---|
| 1~3 | FF | 00 | 00 | F1 | FF | 00 | 00 | EC |
| 4~9 | FF | 00 | 00 | B6 | FF | 00 | 00 | AB |
| 10~263 | FF | 00 | 00 | 9D | FF | 00 | 00 | 80 |
| 264~265 | FF | 00 | 00 | B6 | FF | 00 | 00 | AB |
| 266~272 | FF | 00 | 00 | F1 | FF | 00 | 00 | EC |
| 273~525 | FF | 00 | 00 | DA | FF | 00 | 00 | C7 |

VERTICAL SYNCHRONIZING SIGNAL GENERATION APPARATUS AND VIDEO SIGNAL PROCESSING APPARATUS

TECHNICAL FIELD

The present invention relates to signal processing of equipment handling video signals, and more particularly, to a technology of stably separating vertical synchronizing (sync) signals of video signals.

BACKGROUND ART

Equipment for displaying and recording/reproducing video signals, such as TVs and videotape recorders (VTRs), performs signal processing based on sync signals superimposed on the video signals in their blanking intervals. Therefore, to ensure stable display and recording/reproduction, it is required to separate sync signals invariably stably, irrespective of the quality of input video signals. Japanese Laid-Open Patent Publication No. 01-71280, for example, discloses that stabilization of a separated horizontal sync signal is improved by using a horizontal sync signal generated by an automatic frequency control (AFC) circuit, which is free from excessive or missing synchronizing pulses, in place of the separated horizontal sync signal itself.

As for stabilization of a vertical sync signal, also, an example using an AFC circuit is disclosed in Japanese Laid-Open Patent Publication No. 4-188960. FIG. 23 is a block diagram of such a conventional vertical sync signal generator.

Referring to FIG. 23, a sync signal separation circuit 91 receives a video signal including a luminance signal, separates a vertical sync signal from the video signal, and outputs the separated signal to an AFC circuit 92 and a vertical sync signal detection circuit 93. The AFC circuit 92 and a FvVCO circuit 94 constitute a phase locked loop (PLL) having a feedback loop. The AFC circuit 92 compares the phase of the vertical sync signal separated by the sync signal separation circuit 91 with the phase of a signal output from the FvVCO circuit 94, and outputs the resultant phase error to the FvVCO circuit 94. The FvVCO circuit 94 changes its oscillating frequency according to the phase error and outputs a signal having a frequency equal to the vertical frequency. Therefore, a frequency-stabilized signal can be output from the FvVCO circuit 94 even if the vertical sync signal separated by the sync signal separation circuit 91 has excessive or missing synchronizing pulses.

The vertical sync signal detection circuit 93 detects existence/absence of a vertical sync signal and outputs the result to a selector 96 as a selection signal. A FvOSC circuit 95 oscillates in free-run operation, and the output thereof has a frequency stabilized at the vertical frequency. The FvOSC circuit 95 outputs the generated signal to the selector 96. The selector 96 selects one of the outputs of the FvVCO circuit 94 and the FvOSC circuit 95 based on the output of the vertical sync signal detection circuit 93, and outputs the result as the vertical sync signal.

That is, the selector 96 selects and outputs the PLL-stabilized output of the FvVCO circuit 94 when a vertical sync signal in the video signal is detected by the vertical sync signal detection circuit 93. When no vertical sync signal is detected, the selector 96 selects and outputs the output of the FvOSC circuit 95 stably oscillating in free-run operation.

Problem to be Solved

In the configuration described above, switching is made between the signal synchronizing with the vertical sync signal of the input video signal and the signal output from the circuit oscillating in free-run operation, according to existence/absence of a vertical sync signal in the input video signal. Therefore, immediately after the switching, the pulse interval of the vertical sync signal loses continuity, causing synchronization disorder.

In still reproduction in a VTR, for example, the input video signal includes a vertical sync signal, but the vertical sync signal has periods changing alternately every field. When such a video signal is input, the selector 96 selects and outputs the output of the FvVCO circuit 94. Since the PLL averages the frequency of the vertical sync signal of the input video signal, the output of the FvVCO circuit 94 goes out of synchronization with the input video signal.

DISCLOSURE OF THE INVENTION

An object of the present invention is providing a vertical sync signal generator capable of providing a vertical sync signal having a stable period and also providing a vertical sync signal synchronizing with a vertical sync signal contained in an input signal even when the vertical sync signal contained in the input signal has two different periods repeated alternately.

Another object of the present invention is providing a video signal processor capable of securing invariably stable frame synchronization of a video signal even when a vertical sync signal contained in an input signal has two different periods repeated alternately.

Yet another object of the present invention is providing a video signal processor capable of providing standard video data completely conforming to a standard even when a vertical sync signal contained in an input signal has two different periods repeated alternately.

Yet another object of the present invention is providing a vertical sync signal generator capable of providing a vertical sync signal having a stable period by swiftly drawing the signal into synchronization with a vertical sync signal contained in the input signal even when the input signal goes out of phase.

The vertical sync signal generator of the present invention includes: a vertical sync signal separation circuit for separating a vertical sync signal of an input luminance signal and outputting the separated signal as a first vertical sync signal; an automatic frequency control circuit for receiving the first vertical sync signal, generating a second vertical sync signal having a repeat frequency corresponding with an average repeat frequency of the first vertical sync signal, and outputting the generated signal; a vertical sync signal phase detection circuit for detecting whether or not the first vertical sync signal has two different periods repeated alternately, and outputting the detection result as a decision signal; and a selector for receiving the first and second vertical sync signals, selecting the first vertical sync signal when the decision signal indicates that the first vertical sync signal has two different periods repeated alternately and otherwise selecting the second vertical sync signal, and outputting the selected signal.

According to the invention described above, it is possible to provide a vertical sync signal having a stable frequency and no pulse missing. When the first vertical sync signal contained in an input signal has two different periods repeated alternately, the first vertical sync signal, not the second vertical sync signal, is selected. Therefore, a vertical sync signal invariably synchronizing with the input luminance signal can be obtained. In addition, since the first and second vertical sync signal synchronize with each other, no disorder of synchronization occurs during switching of the selected vertical sync signal.

Preferably, the automatic frequency control circuit includes: an integrator circuit of m bits (m is a natural number) for accumulating input values; a phase comparator circuit for sampling an output of the integrator circuit at the timing of the first vertical sync signal and outputting a difference between a sampled value and a predetermined value; a low pass filter for allowing passing of a low-frequency component out of the output of the phase comparator circuit; an adder circuit for adding a constant to an output of the low pass filter and outputting the result to the integrator circuit; and a differential circuit for differentiating the most significant bit of the integrator circuit and outputting the second vertical sync signal at a timing of the resultant edge.

Preferably, the vertical sync signal phase detection circuit includes: a V period counter reset at the timing of the first vertical sync signal, for counting the number of pulses of a clock and outputting the count value; a first hold circuit for latching the output of the V period counter at the timing of the first vertical sync signal, outputting the latched value, and holding the output until next latching; a first subtractor circuit for calculating a difference between the output of the V period counter and the output of the first hold circuit and outputting the result; a first absolute value circuit for obtaining an absolute value of the output of the first subtractor circuit and outputting the result; a second hold circuit for latching the output of the first absolute value circuit at the timing of the first vertical sync signal, outputting the latched value, and holding the output until next latching; a second subtractor circuit for calculating a difference between the output of the first absolute value circuit and the output of the second hold circuit and outputting the result; a second absolute value circuit for obtaining an absolute value of the output of the second subtractor circuit and outputting the result; a first comparator circuit for comparing the output of the first absolute value circuit with a first constant and outputting the result; a second comparator circuit for comparing the output of the second absolute value circuit with a second constant and outputting the result; and a logic circuit for conducting logic operation of the output of the first comparator circuit and the output of the second comparator circuit and outputting the result as the decision signal.

The video signal processor of the present invention includes: a vertical sync signal generator; a horizontal sync signal separation circuit for separating a horizontal sync signal of an input luminance signal and outputting the separated signal; and a frame sync circuit having a frame memory, for generating a write address in a predetermined order based on an output of the vertical sync signal generator, the horizontal sync signal and a write clock, and writing an input video signal into the frame memory according to the write address, as well as generating a read address in the same order as the order of the write address based on a read clock, reading the signal from the frame memory according to the read address, and outputting the read signal as a standard video signal, wherein the vertical sync signal generator includes: a vertical sync signal separation circuit for separating a vertical sync signal of the input luminance signal and outputting the separated signal as a first vertical sync signal; an automatic frequency control circuit for receiving the first vertical sync signal, generating a second vertical sync signal having a repeat frequency corresponding with an average repeat frequency of the first vertical sync signal, and outputting the generated signal; a vertical sync signal phase detection circuit for detecting whether or not the first vertical sync signal has two different periods repeated alternately, and outputting the detection result as a decision signal; and a selector for receiving the first and second vertical sync signals, selecting the first vertical sync signal when the decision signal indicates that the first vertical sync signal has two different periods repeated alternately and otherwise selecting the second vertical sync signal, and outputting the selected signal, and when the rate at which the write address changes and the rate at which the read address changes are different from each other, the frame sync circuit controls the write into the frame memory or the read from the frame memory so that during read of a signal of a given frame from the frame memory, read of a signal of a frame other than the given frame caused by address overtaking does not occur.

According to the present invention described above, by using the vertical sync signal generator described above, a video signal displayed is free from inter-field deviation even when the vertical sync signal contained in the input signal has two different periods repeated alternately, and thus an invariably frame-synchronizing video signal can be obtained. In addition, during read of a signal of a given frame from the frame memory, no signal of a frame other than the given frame will be read, which may otherwise occur due to address overtaking. Accordingly, discontinuity of an image in a read frame is prevented.

Preferably, the frame sync circuit has at least two frame memories, and includes: a write control circuit for generating a write selection signal for selecting a frame memory into which a signal is written, from the two frame memories, and the write address for the selected frame memory, based on the output of the vertical sync signal generator, the horizontal sync signal and the write clock, and outputting the generated signal and address; a read control circuit for counting the read clock, generating the read address for the two frame memories according to the resultant count value, and outputting the generated address; and a skip/hold control circuit for generating a skip/hold control signal for selecting a frame memory from which a signal is read, based on the trends of changes of the write address and the read address, and outputting the generated signal, and the frame sync circuit writes an input video signal into the frame memory selected with the write selection signal according to the write address, and also reads a signal from the frame memory selected with the skip/hold control signal according to the read address and outputs the signal as the standard video signal.

Preferably, the frame sync circuit includes: a line memory for delaying an input video signal by a time corresponding to a predetermined number of lines and outputting the delayed signal; a write control circuit for generating the write address for the frame memory based on the output of the vertical sync signal generator, the horizontal sync signal and the write clock, and outputting the generated address; a read control circuit for counting the read clock, generating the read address for the frame memory according to the resultant count value, and outputting the generated address; and a skip/hold control circuit for generating a skip/hold control signal for controlling so that either one of the input video signal and the output of the line memory is selected based on a difference between the write address and the read address and written into the frame memory, the frame sync circuit writes one of the input video signal and the output of the line memory selected with the skip/hold control signal into the frame memory according to the write address, and also reads a signal from the frame memory according to the read address and outputs the signal as the standard video signal.

The video signal processor described above preferably further includes a data multiplexer circuit for adding a data group representing a start mark, an end mark and a blanking time to data of each line of the standard video signal output from the frame sync circuit.

According to the invention described above, the standard video data completely conforming to a digital signal standard can be obtained even when the vertical sync signal contained in an input signal has two different periods repeated alternately.

The vertical sync signal generator of the present invention includes: a vertical sync signal separation circuit for separating a vertical sync signal of an input luminance signal and outputting the separated signal as a first vertical sync signal; an automatic frequency control circuit for receiving the first vertical sync signal, generating a second vertical sync signal having a repeat frequency corresponding with an average repeat frequency of the first vertical sync signal and a phase error signal indicating a phase difference between the first vertical sync signal and the second vertical sync signal, and outputting the generated signals; a vertical sync signal phase detection circuit for detecting whether or not the first vertical sync signal and the second vertical sync signal are out of phase with each other based on the phase error signal, and outputting the detection result as a decision signal; and a selector for receiving the first and second vertical sync signals, selecting the first vertical sync signal when the decision signal indicates that the first vertical sync signal and the second vertical sync signal are out of phase with each other and otherwise selecting the second vertical sync signal, and outputting the selected signal.

According to the invention described above, when the first vertical sync signal contained in an input signal is out of phase with the second vertical sync signal during power-on, scene switching and in other occasions, the first vertical sync signal, not the second vertical sync signal, is selected and output. This makes it possible to provide a vertical sync signal having a stable frequency and no pulse missing, and also provide a vertical sync signal invariably synchronizing with the input luminance signal.

Preferably, the automatic frequency control circuit includes: an integrator circuit of m bits for accumulating input values; a phase comparator circuit for sampling an output of the integrator circuit at the timing of the first vertical sync signal and outputting a difference between a sampled value and a predetermined value as the phase error signal; a first low pass filter for allowing passing of a low-frequency component out of the phase error signal; a second low pass filter for allowing passing of the low-frequency component and a component having a higher frequency than the low-frequency component out of the phase error signal; a filter selector for selecting an output of the second low pass filter when the decision signal indicates that the first vertical sync signal and the second vertical sync signal are out of phase with each other and otherwise selecting an output of the first low pass filter, and outputting the selected signal; an adder circuit for adding a constant to the output of the filter selector and outputting the result to the integrator circuit; and a differential circuit for differentiating the most significant bit of the integrator circuit and outputting the second vertical sync signal at the timing of the resultant edge.

According to the invention described above, when the first vertical sync signal and the second vertical sync signal are out of phase with each other, the output of the low pass filter having faster transient response is selected. This enables swift drawing of the second vertical sync signal into synchronization with the first vertical sync signal.

Preferably, the vertical sync signal phase detection circuit includes: an absolute value circuit for obtaining an absolute value of the phase error signal and outputting the result; a hold circuit for latching the output of the absolute value circuit at the timing of the first vertical sync signal, outputting the latched value, and holding the output until next latching; a lockout comparator circuit for comparing the output of the hold circuit with a first constant and outputting the comparison result; a lockout counter for counting the number of pulses of the first vertical sync signal when the output of the lockout comparator circuit indicates that the output of the absolute value circuit is equal to or larger than the first constant, and outputting the resultant count value; a lockout decision circuit for outputting a lockout differential pulse when the count value of the lockout counter is equal to a second constant; a lock-in comparator circuit for comparing the output of the hold circuit with a third constant and outputting the comparison result; a lock-in counter for counting the number of pulses of the first vertical sync signal when the output of the lock-in comparator circuit indicates that the output of the absolute value circuit is equal to or smaller than the third constant, and outputting the resultant count value; a lock-in decision circuit for outputting a lock-in differential pulse when the count value of the lock-in counter is equal to a fourth constant; and a logic circuit for outputting the decision signal indicating that the first vertical sync signal and the second vertical sync signal are out of phase with each other when the lockout decision circuit outputs the lockout differential pulse, and outputting the decision signal indicating that the first vertical sync signal and the second vertical sync signal are not out of phase with each other when the lock-in decision circuit outputs the lock-in differential pulse.

According to the present invention described above, the lock-in differential pulse is output only after the absolute value of the phase error signal is kept small for a certain time period, and in response to this, the decision signal is changed to the level indicating that the first and second vertical sync signals are not out of phase with each other. Therefore, the selector switches the selection from the first vertical sync signal to the second vertical sync signal in the state that the first and second vertical sync signals are in synchronization with each other. Thus, no disorder occurs in the vertical sync signal output from the selector.

Effect of the Invention

As described above, according to the present invention, a vertical sync signal having a stable period can be provided. In addition, an invariably frame-synchronizing video signal can be provided even when the vertical sync signal contained in an input signal has two different periods repeated alternately or when the input vertical sync signal abruptly goes out of phase. Therefore, standard video data completely conforming to a digital signal standard can be obtained.

BRIEF DESCRIPTION OF THE DRAWINGS

FIG. 2(a) is a graph showing the waveform of a luminance signal during a vertical blanking interval and the timings of separated sync signals for an odd field.

FIG. 2(b) is a graph showing the waveform of a luminance signal during a vertical blanking interval and the timings of separated sync signals for an even field.

FIG. 6 is a view showing values output from respective components of the vertical sync signal phase detection circuit.

FIG. 9(a) is a graph demonstrating operation of a skip/hold control circuit in FIG. 7 in the case that write operation overtakes read operation.

FIG. 9(b) is a graph demonstrating operation of the skip/hold control circuit in FIG. 7 in the case that read operation overtakes write operation.

BEST MODE FOR CARRYING OUT THE INVENTION

Hereinafter, embodiments of the present invention will be described with reference to the relevant drawings.

(Embodiment 1)

Figure 1:
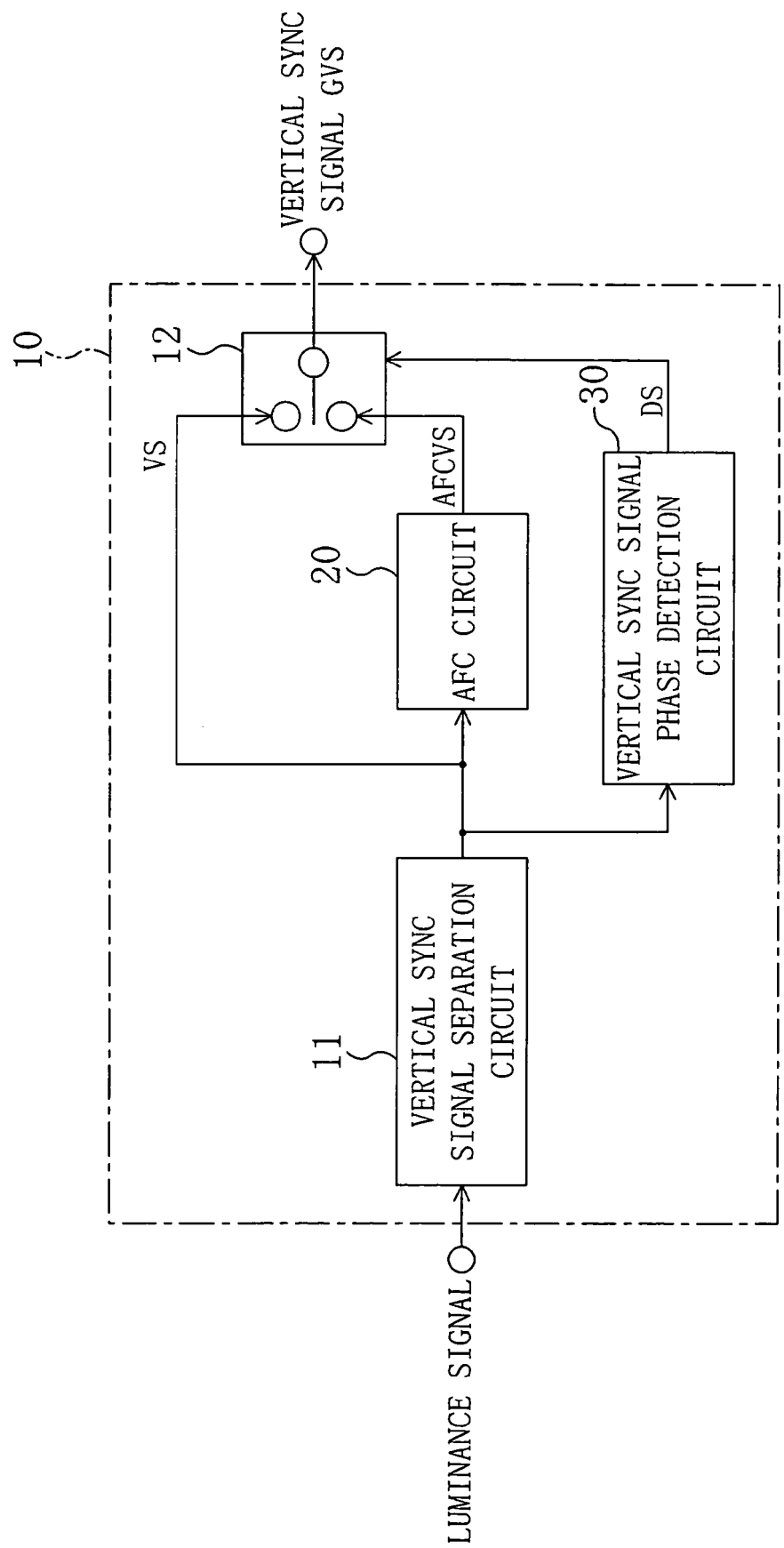
FIG. 1 is a block diagram of a vertical sync signal generator of Embodiment 1 of the present invention.

FIG. 1 is a block diagram of a vertical sync signal generator of Embodiment 1 of the present invention. A vertical sync signal generator 10 of FIG. 1 includes a vertical sync signal separation circuit 11, an automatic frequency control (AFC) circuit 20, a vertical sync signal phase detection circuit 30 and a selector 12.

Assume that a luminance signal input into the vertical sync signal generator 10 of FIG. 1 is one separated from a video signal of the National Television System Committee (NTSC) system and that a clock having a frequency fs is input into the vertical sync signal separation circuit 11, the AFC circuit 20, the vertical sync signal phase detection circuit 30 and the selector 12.

The vertical sync signal separation circuit 11 separates a first vertical sync signal VS superimposed on the input luminance signal during each vertical blanking interval, and outputs the separated signal to the AFC circuit 20, the vertical sync signal phase detection circuit 30 and the selector 12. The AFC circuit 20, provided with a phase locked loop (PLL), generates a second vertical sync signal AFCVS that roughly synchronizes with the vertical sync signal VS and has a repeat frequency corresponding with the average repeat frequency of the vertical sync signal VS, and outputs the generated signal to the selector 12. The vertical sync signal phase detection circuit 30 outputs a decision signal DS corresponding to the state of the vertical sync signal VS to the selector 12. The selector 12 selects either one of the vertical sync signal VS and the vertical sync signal AFCVS according to the decision signal DS, and outputs the result as a vertical sync signal GVS.

Hereinafter, operation of the vertical sync signal generator 10 of Embodiment 1 of the present invention will be described.

FIG. 2(a) is a graph showing the waveform of the luminance signal during a vertical blanking interval and the timings of separated sync signals for an odd field. FIG. 2(b) is a graph showing the waveform of the luminance signal during a vertical blanking interval and the timings of separated sync signals for an even field. The time length of three lines from the start of the fourth line in the odd field and the time length of three lines from the center of the 266th line in the even field respectively constitute a vertical sync pulse period. The vertical sync signal separation circuit 11 detects such a vertical sync pulse period and outputs a pulse of the vertical sync signal VS at the timing of the start of the vertical sync pulse period.

Figure 3:
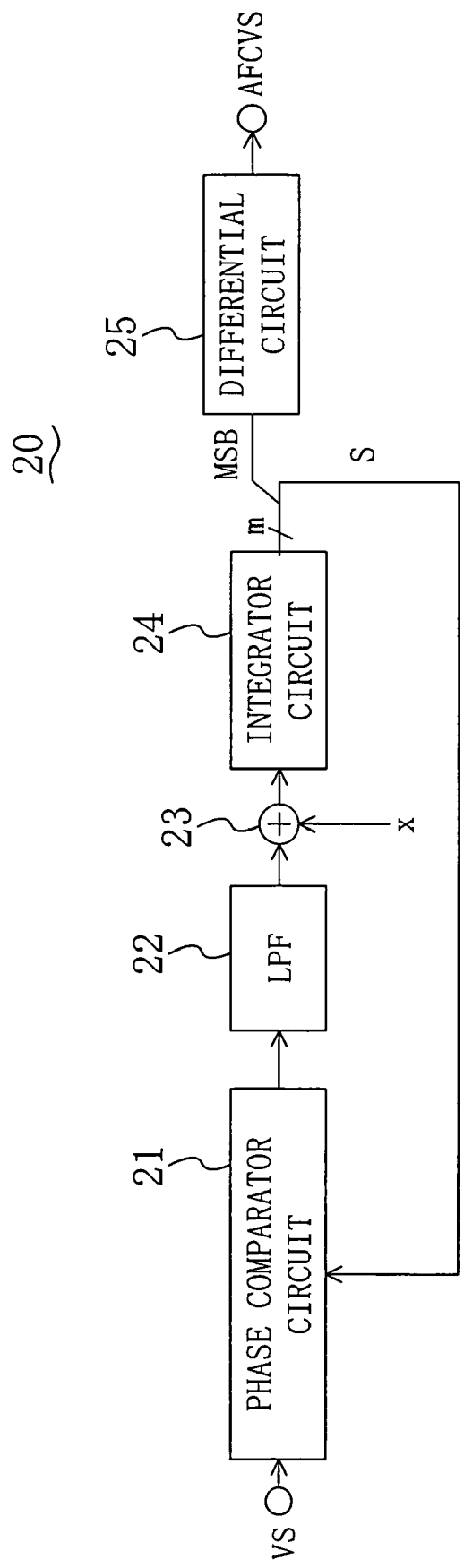
FIG. 3 is a block diagram of an example of an AFC circuit in FIG. 1.

FIG. 3 is a block diagram of an example of the AFC circuit 20 in FIG. 1. As shown in FIG. 3, the AFC circuit 20 includes a phase comparator circuit 21, a low pass filter (LPF) 22, an adder circuit 23, an integrator circuit 24 and a differential circuit 25.

The phase comparator circuit 21 samples an output S of the integrator circuit 24 at the timing of each pulse of the vertical sync signal VS, subtracts the sampled value from D/2, for example, where D=$2^m$ (m is a natural number), and outputs the result. The LPF 22, which is a complete integral type LPF, for example, allows passing of only a component having a frequency equal to or less than a given frequency out of the output of the phase comparator circuit 21, and outputs the result to the adder circuit 23.

The adder circuit 23 adds a constant X to the output of the LPF 22, and outputs the result to the integrator circuit 24. The integrator circuit 24, which is adapted to operation of m-bit width, accumulates the output of the adder circuit 23 and outputs the result S to the phase comparator circuit 21 and the differential circuit 25.

The differential circuit 25 outputs a pulse as the vertical sync signal AFCVS when the output S of the integrator circuit 24 reaches D/2. For example, the differential circuit 25 detects a timing at which the most significant bit (MSB) of the output S of the integrated circuit 24 changes from "L" to "H" ("L" and "H" respectively represent logical low and high potentials), and outputs a pulse at the timing of the detection.

FIG. 4(*a*) is a timing chart showing operation of the AFC circuit 20 in FIG. 1 performed when the vertical sync signal VS has a constant period T. FIG. 4(*b*) is a timing chart showing operation of the AFC circuit 20 in FIG. 1 performed when the vertical sync signal VS has two different periods T and T' repeated alternately.

As shown in FIG. 4(*a*), in order to set so that the time period during which the integrator circuit 24 increments its count value from 0 to reach D−1 and then puts it back to 0 is equal to the period T of the vertical sync signal VS, X=D/(fs×T) should be established.

The phase comparator circuit 21 samples the output S of the integrator circuit 24 at the timing of the vertical sync signal VS. The phase comparator circuit 21 outputs the difference between the sampled value and the value D/2 to the LPF 22 as an error signal. For example, if the sampled value is below the value D/2, the error signal has a positive value.

The LPF 22 smoothes the error signal and outputs the result to the adder circuit 23. The adder circuit 23 adds the constant X to the output of the LPF 22 and outputs the result to the integrator circuit 24. The integrator circuit 24 adds the output of the adder circuit 23 to the accumulated value held therein and again outputs the result to the phase comparator circuit 21. For example, when the error signal is a positive value, the output S of the integrator circuit 24 increases greatly, and this speeds up the timing at which the output S reaches D/2.

As described above, the AFC circuit 20 has a feedback loop serving as a PLL circuit, in which the output S of the integrator circuit 24 repeats transient response. Therefore, finally, the output S matches with the vertical sync signal VS in repeat frequency and synchronizes with the vertical sync signal VS in phase, as shown in FIG. 4(*a*).

In the case that the period of the vertical sync signal VS is constant, the vertical sync signal AFCVS synchronizes with the vertical sync signal VS. If a pulse of the vertical sync signal VS is unexpectedly missing, the phase comparator circuit 21 does not sample the output S of the integrator circuit 24, and thus the outputs of the LPF 22 and the adder circuit 23 remain unchanged. In this case, therefore, the vertical sync signal AFCVS output from the differential circuit 25 compensates the missing pulse of the vertical sync signal VS.

In the case that the period of the vertical sync signal VS is roughly constant but the timing of the vertical sync signal VS varies back and forth repeatedly due to noise and the like, the error of the sampled value from D/2 obtained by the phase comparator circuit 21 is very small as long as the variation is as small as an amount of several clocks. Since such an error does not pass through the LPF 22, it won't affect the input of the integrator circuit 24. Accordingly, the vertical sync signal AFCVS remains stable even when the timing of the vertical sync signal VS repeats a slight variation.

However a problem arises in the case that the vertical sync signal VS has two different periods T and T' repeated alternately as shown in FIG. 4(*b*) (assume that the difference between the periods T and T' corresponds to a time period of several scanning lines). If the difference between the periods T and T' corresponds to a time period during which the integrator circuit 24 increases the output S by 2α, the sampled value from the phase comparator circuit 21 alternately changes between D/2+α and D/2−α. Therefore, the output of the LPF 22 is averaged to zero. This results in that, while the average repeat frequency of the vertical sync signal AFCVS as the output of the differential circuit 25 matches with that of the vertical sync signal VS, pulses of the vertical sync signal AFCVS are alternately located ahead of and behind those of the vertical sync signal VS.

Thus, the vertical sync signal AFCVS as the output of the AFC circuit 20 is of no use in the case that the vertical sync signal VS has two different periods T and T' repeated alternately. Detection of such a case is therefore required.

Figure 5:
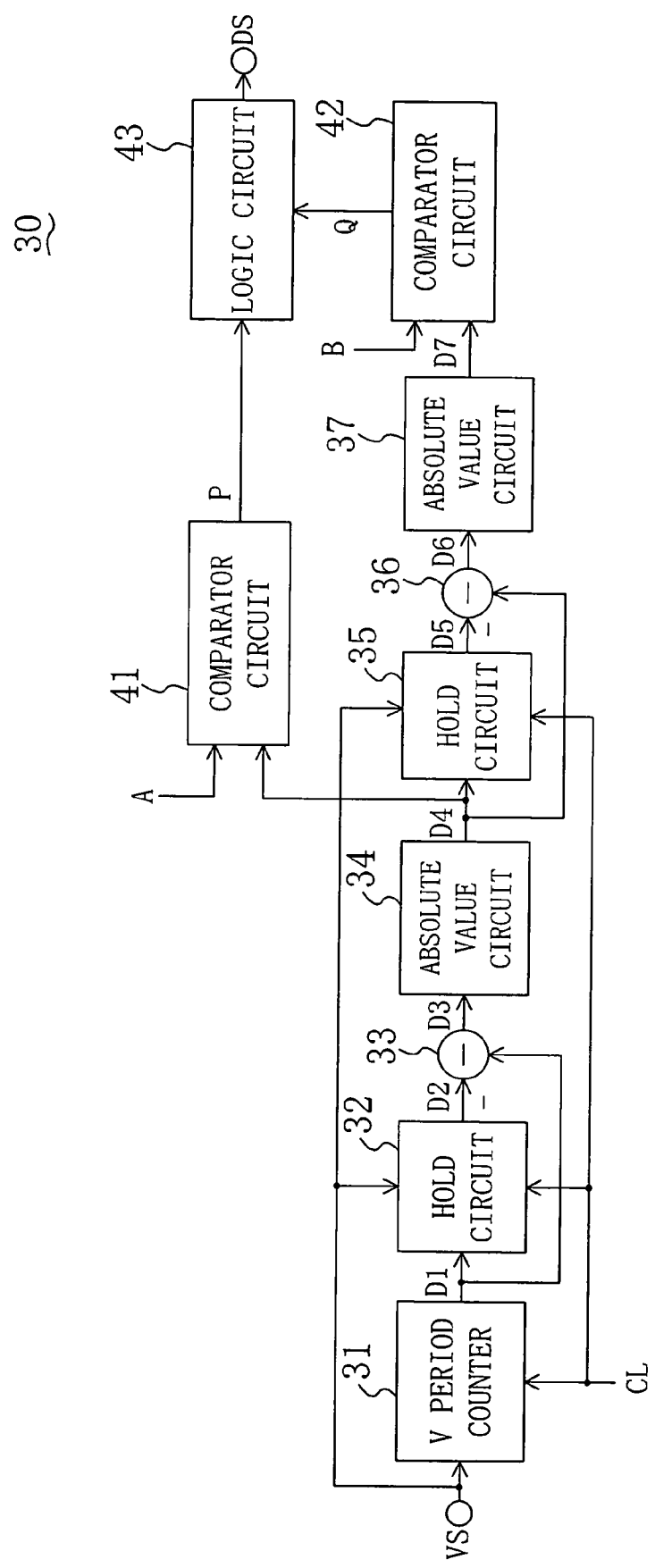
FIG. 5 is a block diagram of an example of a vertical sync signal phase detection circuit in FIG. 1.

FIG. 5 is a block diagram of an example of the vertical sync signal phase detection circuit 30 in FIG. 1. The vertical sync signal phase detection circuit 30 of FIG. 5 includes a V period counter 31, a first hold circuit 32, a first subtractor circuit 33, a first absolute value circuit 34, a second hold circuit 35, a second subtractor circuit 36, a second absolute value circuit 37, a first comparator circuit 41, a second comparator circuit 42 and a logic circuit 43.

The V period counter 31 receives the vertical sync signal VS and a clock CL having a frequency fs. The V period counter 31 continues counting pulses of the clock CL, and outputs the count value to the hold circuit 32 and the subtractor circuit 33. Also, the V period counter 31 resets the count value to 0 once a pulse of the vertical sync signal VS is input, and stops incrementing once the count value reaches the maximum countable value. The hold circuit 32 latches the output D1 of the V period counter 31 in synchronization with the clock CL once a pulse of the vertical sync signal VS is input, and holds the latched signal until the hold circuit 32 receives the next pulse of the vertical sync signal VS and further receives a pulse of the clock CL. The hold circuit 32 outputs the held value to the subtractor circuit 33.

The subtractor circuit 33 subtracts the output D2 of the hold circuit 32 from the output D1 of the V period counter 31, and outputs the result to the absolute value circuit 34. The absolute value circuit 34 obtains the absolute value of the output D3 of the subtractor circuit 33 and outputs the result to the hold circuit 35, the subtractor circuit 36 and the comparator circuit 41. The comparator circuit 41 compares the output D4 of the absolute value circuit 34 with a constant A in magnitude and outputs the result P to the logic circuit 43. The output P of the comparator 41 is "1" when D4>A and otherwise "0", for example. The hold circuit 35 latches the output D4 of the absolute value circuit 34 in synchronization with the clock CL once a pulse of the vertical sync signal VS is input, and holds the latched signal until the hold circuit 35 receives a next pulse of the vertical sync signal VS and further receives a pulse of the clock CL. The hold circuit 35 outputs the held value to the subtractor circuit 36.

The subtractor circuit 36 subtracts the output D5 of the hold circuit 35 from the output D4 of the absolute value circuit 34, and outputs the result to the absolute value circuit 37. The absolute value circuit 37 obtains the absolute value of the output D6 of the subtractor circuit 36 and outputs the result to the comparator circuit 42. The comparator circuit 42 compares the output D7 of the absolute value circuit 37 with a constant B in magnitude and outputs the result Q to the logic circuit 43. The output Q of the comparator circuit 42 is "1" when D7>B and otherwise "0", for example. The logic circuit 43 conducts logical operation of the output P of the comparator circuit 41 and the output Q of the comparator circuit 42, and outputs the result as the decision signal DS.

Figure 4A:
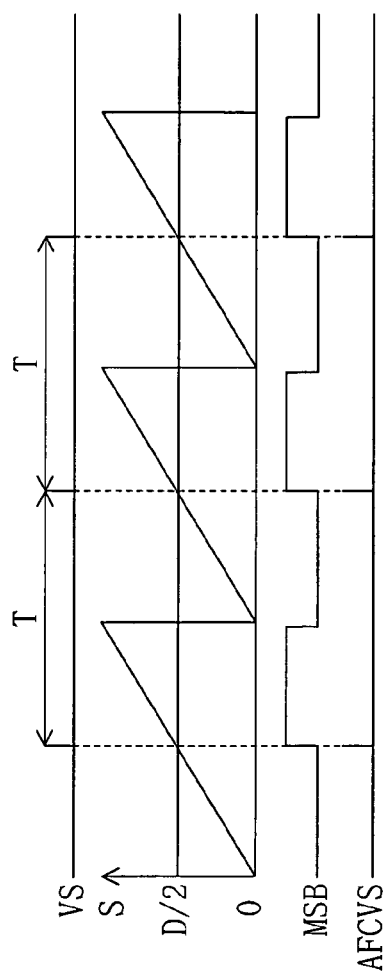
FIG. 4(a) is a timing chart showing operation of the AFC circuit in FIG. 1 in the case that the vertical sync signal VS has a constant period T.
Figure 4B:
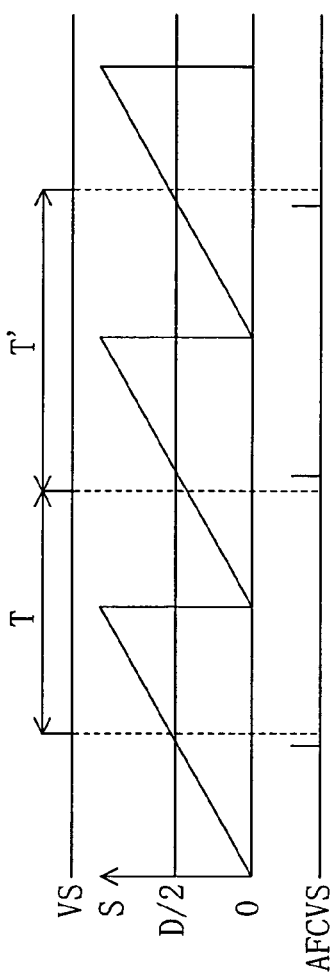
FIG. 4(b) is a timing chart showing operation of the AFC circuit in FIG. 1 in the case that the vertical sync signal VS has two different periods T and T' repeated alternately.

FIG. 6 shows details of the values output from the components of the vertical sync signal phase detection circuit 30. Referring to FIG. 6, operation of the vertical sync signal phase detection circuit 30 will be described. As an example, assume that the clock frequency (sampling frequency) fs is 27 MHz, and the count values until which the V period counter 31 increments during the time period of one scanning line and the time period of one field are H=1716 and V=450450, respectively. Also, assume that the count values until which the V period counter 31 increments during the time periods T and T' in FIGS. 4(a) and 4(b) are V and V+H, respectively, and the number of bits of the V period counter is 19.

The following four cases may occur for the period of the vertical sync signal VS. Assume in the following description of these cases that the constant A input into the comparator circuit 41 satisfies 0<A<H, and the constant B input into the comparator circuit 42 satisfies $0<B<2^{19}-V-1$.

(1) Case that the Period of the Vertical Sync Signal VS is Constant

The output D1 of the V period counter is the constant value V, and thus the output D2 of the hold circuit 32 is also the constant value V. This gives 0 to all of the output D3 of the subtractor circuit 33, the output D4 of the absolute value circuit 34, the output D5 of the hold circuit 35, the output D6 of the subtractor circuit 36 and the output D7 of the absolute value circuit 37. Therefore, P=Q=0.

(2) Case that the Period of the Vertical Sync Signal VS is Roughly Constant but Varies by Several Clocks D1 has an error α1 of several clocks from the constant value V, and D2 also has an error α2 of roughly the same amount. The output D3 of the subtractor circuit 33 as the difference between D1 and D2 is so minute compared with the constant value V that D3≈0 may be given. Therefore, D4=D5=D6=D7≈0, and thus P=Q=0.

(3) Case that a Pulse of the Vertical Sync Signal VS is Missing

Since no reset is made for the V period counter 31, the output D1 stops at 219-1. The output D2=V because the hold circuit 32 holds the value received one field earlier. Therefore, $D3=D4=2^{19}-V-1$. D5=0 because the hold circuit 35 holds the state before the pulse missing. Therefore, $D6=D7=2^{19}-V-1$, and thus P=Q=1.

(4) Case that the Vertical Sync Signal VS has Two Different Periods T and T' Repeated Alternately When D1=V+H and D2=V, D3=V. When D1=V and D2=V+H, D3=−V. In either case, D4=H. Therefore, D5=H, and D6=D7=0, and thus P=1 and Q=0.

The logic circuit 43 determines logical AND of the output P of the comparator circuit 41 and the inverted signal of the output Q of the comparator circuit 42, and outputs the result as the decision signal DS. Thus, the case (4) can be detected because the decision signal DS is "1" only in this case.

The selector 12 selects the vertical sync signal AFCVS when the decision signal DS output from the vertical sync signal phase detection circuit 30 is "0", and selects the vertical sync signal VS when the decision signal DS is "1", that is, when the vertical sync signal VS has two alternately repeated periods, and outputs the selected signal as the vertical sync signal GVS.

As described above, the vertical sync signal generator of this embodiment normally outputs the vertical sync signal AFCVS, but outputs the vertical sync signal VS in place of the vertical sync signal AFCVS when it is detected that the vertical sync signal VS has two alternately repeated periods. In this way, a vertical sync signal invariably synchronizing with the luminance signal of the input video signal can be obtained without occurrence of missing or disorder.

(Embodiment 2)

Figure 7:
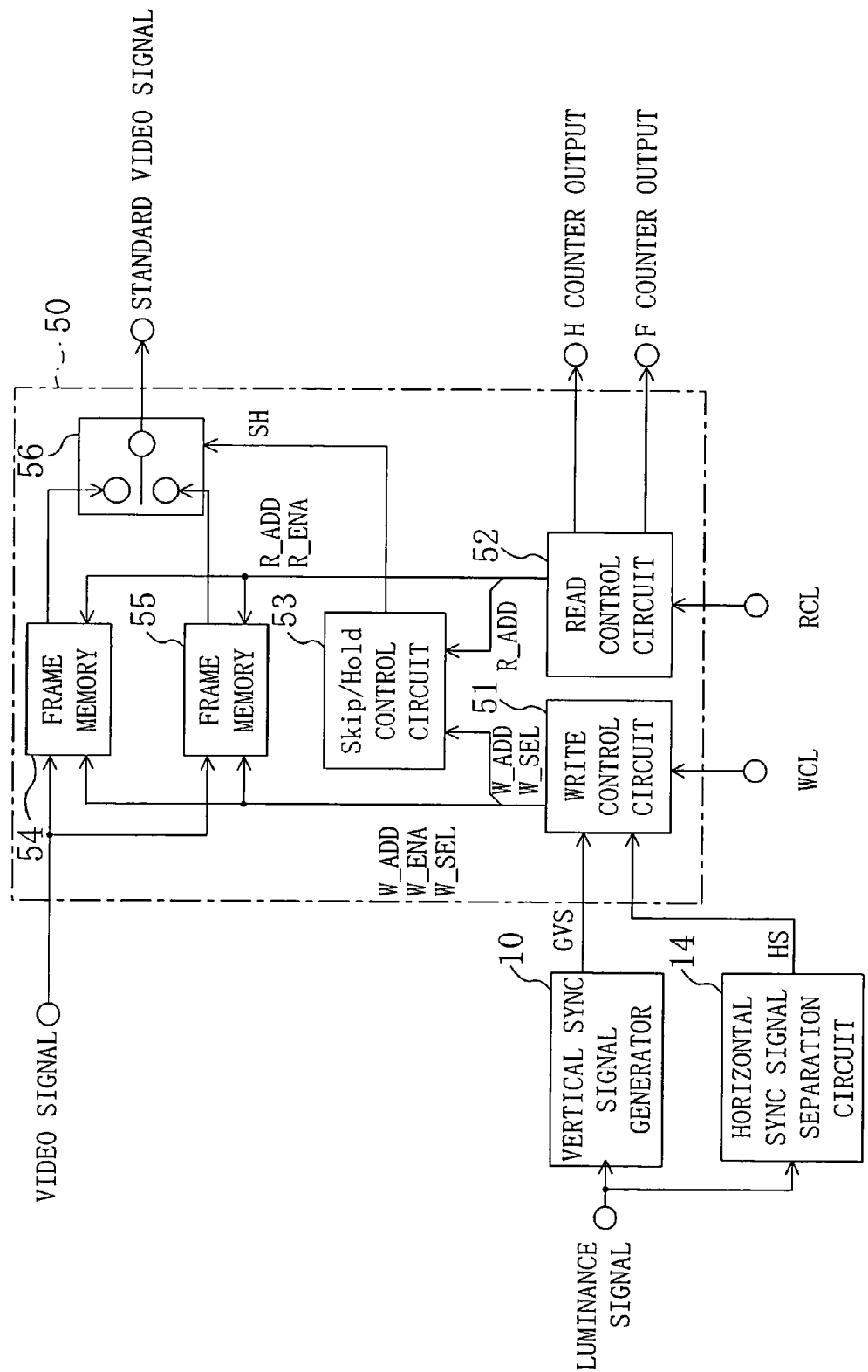
FIG. 7 is a block diagram of a video signal processor of Embodiment 2 of the present invention.

FIG. 7 is a block diagram of a video signal processor of Embodiment 2 of the present invention. The video signal processor of FIG. 7 includes the vertical sync signal generator 10, a horizontal sync signal separation circuit 14 and a frame sync circuit 50. The frame sync circuit 50 includes a write control circuit 51, a read control circuit 52, a skip/hold control circuit 53, frame memories 54 and 55 and a selector 56.

The vertical sync signal generator 10 and the horizontal sync signal separation circuit 14 receive a luminance signal. As described in Embodiment 1, the vertical sync signal generator 10 generates the vertical sync signal GVS invariably synchronizing with the luminance signal of an input video signal without occurrence of missing or disorder, and outputs the signal GVS to the write control circuit 51. The horizontal sync signal separation circuit 14 separates a horizontal sync signal HS superimposed on the input luminance signal during each horizontal blanking interval, and outputs the result to the write control circuit 51.

The write control circuit 51 generates a write address W_ADD for write in the frame memories 54 and 55, a write enable signal W_ENA and a write selection signal W_SEL based on the vertical sync signal GVS, the horizontal sync signal HS and a write clock WCL. The write control circuit 51 counts the write clock WCL when the write enable signal W_ENA is active, and uses the resultant count value as the write address W_ADD, for example. The write control circuit 51 outputs the write address W_ADD and the write selection signal W_SEL to the skip/hold control circuit 53 and the frame memories 54 and 55, and outputs the write enable signal W_ENA to the frame memories 54 and 55.

The read control circuit 52, which receives a read clock RCL, includes a frame counter (F counter, not shown) for counting the read clock RCL every frame period and a line counter (H counter, not shown) for counting the read clock RCL every line period. The F counter and the H counter output the respective count values.

The read control circuit 52 asserts a read enable signal R_ENA only when the output of the H counter corresponds to the active time of the video signal. The F counter conducts counting when the read enable signal R_ENA is active. The read control circuit 52 outputs the output of the F counter to the skip/hold control circuit 53 and the frame memories 54 and 55 as a read address R_ADD, and outputs the read enable signal R_ENA to the frame memories 54 and 55.

The skip/hold control circuit 53 generates a skip/hold control signal SH for controlling the read frame to ensure that, during read of a signal of a given frame from any of the frame memories 54 and 55, read of a signal of a frame other than the given frame caused by address overtaking does not occur, that is, to ensure that no discontinuity of an image occurs in a read frame, and outputs the signal SH to the selector 56. The skip/hold control circuit 53 generally inverts the level of the skip/hold control signal SH every read of a frame.

Each of the frame memories 54 and 55 receives a video signal, and can store data of one frame of the video signal. The write control circuit 51 generates and outputs the write selection signal W_SEL so that the video signal is alternately written into the frame memories 54 and 55 by one frame each. When the write enable signal W_ENA is active, the video signal is written into the frame memory 54 or 55 whichever selected by the write selection signal W_SEL at the write address W_ADD.

When the read enable signal R_ENA is active, data at the read address R_ADD in the frame memories 54 or 55 are output to the selector 56. The selector 56 selects one of the outputs of the frame memories 54 and 55 according to the skip/hold control signal SH, and outputs the selected signal as a completely frame-synchronized standard video signal.

The operation of the video signal processor having the above configuration will be described.

Figure 8A:
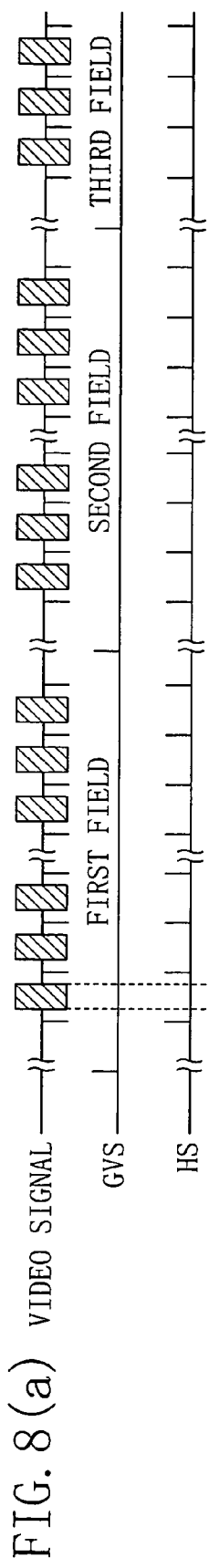
FIG. 8(a) is a graph showing examples of timings of a video signal, a vertical sync signal GVS and a horizontal sync signal HS input into a frame sync circuit in FIG. 7.
Figure 8B:
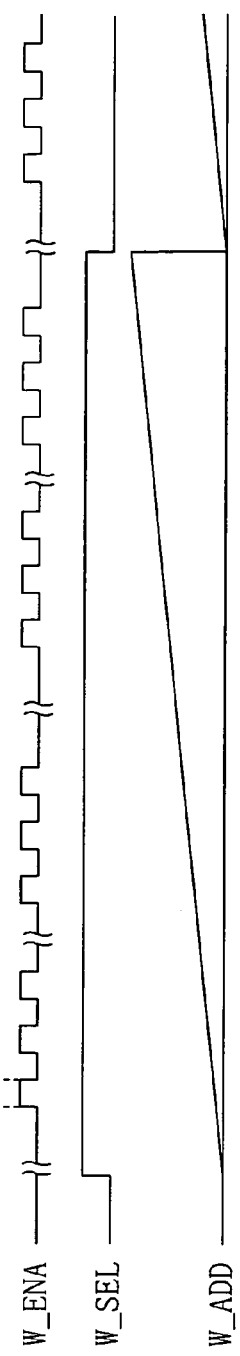
FIG. 8(b) is a graph showing examples of signals output from a write control circuit in FIG. 7.
Figure 8C:
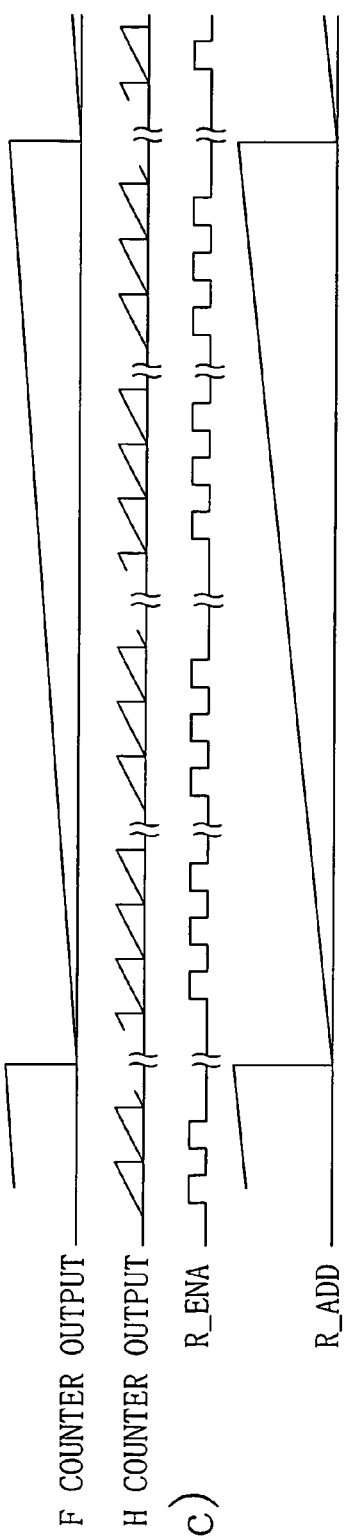
FIG. 8(c) is a graph showing examples of signals output from a read control circuit in FIG. 7.

FIG. 8(a) is a graph showing an example of the timings of the video signal, the vertical sync signal GVS and the horizontal sync signal HS input into the frame sync circuit 50. FIG. 8(b) is a graph showing an example of the signals output from the write control circuit 51. FIG. 8(c) is a graph showing an example of the signals output from the read control circuit 52.

In FIGS. 8(b) and 8(c), the ordinate of each of the write address W_ADD, the read address R_ADD, the F counter output and the H counter output represents the value of each signal. Each hatched rectangle of the video signal represents an active time of the video signal.

The write control circuit 51 detects the start line of the video signal in each field based on the vertical sync signal GVS, and detects each active time of the video signal based on the horizontal sync signal HS, to assert the write enable signal W_ENA (to "H" in the illustrated example) permitting write into the frame memory only during the active time. The write control circuit 51 also generates the write selection signal W_SEL to select the memory frame into which the video signal is written, out of the two frame memories 54 and 55 of the frame sync circuit 50.

The write control circuit 51 initializes the write address W_ADD for the frame memories 54 and 55 at the timing of the vertical sync signal GVS for an odd field, and sequentially increments the address every input of the write clock WCL only for the time period during which the write enable signal W_ENA is active. Although the write address W_ADD is not incremented during each blanking time, it is shown by a straight line in FIG. 8(b) for simplification.

In FIG. 8(c), the read control circuit 52 asserts the read enable signal R_ENA (to "H" in the illustrated example) for the time period during which the H counter output corresponds to each active time of the video signal. The read control circuit 52 sequentially increments the read address R_ADD for the frame memories only for the time period during which the read enable signal R_ENA is active. Although the read address R_ADD is not incremented during each blanking time, it is shown by a straight line in FIG. 8(c) for simplification.

In the frame sync circuit 50, the write operation and the read operation are conducted independently of each other asynchronously. Therefore, the following cases may arise. In one case, the write operation may overtake the read operation. That is, write of new data may be attempted at an address from which old data has not yet been read. In the other case, the read operation may overtake the write operation. That is, read of data may be attempted from an address at which new data has not yet been written.

FIG. 9(a) is a graph demonstrating operation of the skip/hold control circuit 53 in the case that the write operation overtakes the read operation. By the time when the write control circuit 51 finishes write of the n-th (n is an integer) frame into the frame memory 54, for example, the read control circuit 52 has finished read of the (n−2)th frame from the same frame memory 54. Likewise, by the time when the write control circuit 51 finishes write of the (n+1)th frame into the frame memory 55, the read control circuit 52 has finished read of the (n−1)th frame from the same frame memory 55. Assume however that during read of the next n-th frame, the write address W_ADD overtakes the read address R_ADD.

In the event described above, write of the (n+2)th frame will be completed before the operation of reading the n-th frame is completed. The result is that, although the n-th frame is read until the write address overtakes the read address, data of the (n+2)th frame overwritten on the data of the n-th frame will be read after this address overtaking. This will cause discontinuity of an image in the read frame.

The skip/hold control circuit 53 predicts whether or not such address overtaking will occur from the trends of changes of the write address W_ADD and the read address R_ADD. For example, the difference between the write address W_ADD and the read address R_ADD may be obtained after the read of the (n−2)th frame and after the read of the (n−1)th frame. From a change in this difference, whether or not the write address W_ADD will overtake the read address R_ADD during read of the n-th frame can be predicted.

If predicting that during read of the n-th frame, data will be written into the frame memory in which this frame is stored and moreover address overtaking will occur, the skip/hold control circuit 53 does not change the level of the skip/hold control signal SH. The selector 56 therefore does not switch its input, resulting in selecting the (n+1)th frame skipping the n-th frame (that is, "skip" is performed).

Since the (n+1)th frame exists in the frame memory different from the frame memory into which the (n+2)th frame is written, it is not affected by the address overtaking, if any. In this way, it is possible to avoid occurrence of such an event that data of the (n+2)th frame may be read during read of data of the n-th frame since the data of the n-th frame is overwritten with the data of the (n+2)th frame and this may cause discontinuity of an image in a frame.

FIG. 9(b) is a graph demonstrating operation of the skip/hold control circuit 53 in FIG. 7 in the case that the read operation overtakes the write operation. By the time when the read control circuit 52 finishes read of the n-th frame from the frame memory 54, for example, the write control circuit 51 has finished write of the n-th frame into the same frame memory 54. Likewise, by the time when the read control circuit 52 finishes read of the (n+1)th frame from the frame memory 55, the write control circuit 51 has finished write of the (n+1)th frame into the same frame memory 55. Assume however that during read of the next (n+2)th frame, the read address R_ADD overtakes the write address W_ADD.

In the event described above, operation of reading the (n+2)th frame will be completed before write of the (n+2)th frame is completed. The result is that, although the (n+2)th frame is read until the read address overtakes the write address, data of the n-th frame that has not yet been overwritten with data of the (n+2)th frame will be read after this address overtaking. This will cause discontinuity of an image in the read frame.

The skip/hold control circuit 53 predicts whether or not such address overtaking will occur from the trends of changes of the write address W_ADD and the read address R_ADD. For example, the difference between the write address W_ADD and the read address R_ADD may be obtained after the read of the n-th frame and after the read of the (n+1)th frame. From a change in this difference, whether or not the read address R_ADD will overtake the write address W_ADD during read of the (n+2)th frame can be predicted.

If predicting that during read of the (n+2)th frame, data will be written into the frame memory in which this frame is stored and moreover address overtaking will occur, the skip/hold control circuit 53 does not change the level of the skip/hold control signal SH. The selector 56 therefore does not switch its input, resulting in selecting the (n+1)th frame again, not the (n+2)th frame (that is, "hold" is performed).

Since the (n+1)th frame exists in the frame memory different from the frame memory into which the (n+2)th frame is written, it is not affected by the address overtaking, if any. In this way, it is possible to avoid occurrence of such an event that data of the n-th frame before being overwritten with data of the (n+2)th frame may be read during read of the data of the (n+2)th frame and this may cause discontinuity of an image in a frame.

As described above, in the video signal processor of FIG. 7, in the case that the rate at which the write address W_ADD changes is different from the rate at which the read address R_ADD changes, it is ensured that during read of a given frame from a frame memory, read of a signal of a frame other than the given frame caused by address overtaking does not occur. Thus, discontinuity of an image in a read frame is prevented.

Figures 10A, 10B, 10C:
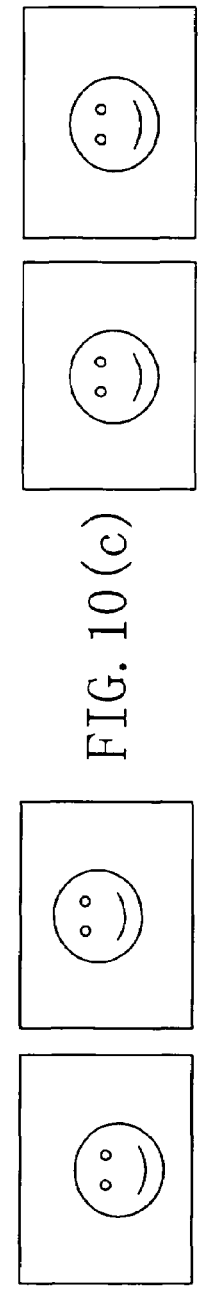
FIG. 10(a) is a view demonstrating a write state of a video signal stored in frame memories in FIG. 7.
FIG. 10(b) is a view demonstrating images output from a video signal processor including the conventional vertical sync signal generator of FIG. 23 in place of the vertical sync signal generator of FIG. 1.
FIG. 10(c) is a view demonstrating images output from the video signal processor of FIG. 7.

FIG. 10(*a*) is a view demonstrating the write state of a video signal stored in the frame memories 54 and 55. Assume herein that the input video signal is a signal of the NTSC system and that a luminance signal (Y) and two color-difference signals (Cr and Cb) are multiplexed at a ratio of Y:Cr:Cb=4:2:2 at a clock of 27 MHz. As a standard, one frame of the video signal is composed of data of 1716 samples horizontally and 525 lines vertically. Among such data, data in the active times of the video signal includes 1440 samples horizontally and 480 lines vertically.

The operation of the frame memories 54 and 55 will be described with reference to FIGS. 7 and 10(*a*). Assume that the frame memory 54 is selected as the write memory with the write selection signal W_SEL. During each active time of the video signal, the write control circuit 51 asserts the write enable signal W_ENA, and while sequentially incrementing the write address W_ADD, writes the data of the video signal in the order of Cr, Y, Cb, Y. Once having written data of 1440 samples, the write control circuit 51 negates the write enable signal W_ENA and puts the write address W_ADD in the hold state.

When the next active time of the video signal comes after the horizontal blanking interval, the write control circuit 51 again asserts the write enable signal W_ENA and starts writing while updating the write address W_ADD. Once having written data of one frame (1440×480 samples), the write control circuit 51 changes the level of the write selection signal W_SEL, to select the frame memory 55 as the write memory. As in the case of the frame memory 54, data of the next frame of the video signal is written into the frame memory 55.

The read control circuit 52 asserts the read enable signal R_ENA according to the H counter output, and while sequentially incrementing the read address R_ADD, reads the data of the video signal in the order of Cr, Y, Cb, Y sequentially.

The case that the vertical sync signal VS has the two different periods T and T' repeated alternately as shown in FIG. 4(*b*) will be described. FIG. 10(*b*) is a view showing images output from a video signal processor using the conventional vertical sync signal generator of FIG. 23. FIG. 10(*c*) is a view showing images output from the video signal processor of FIG. 7.

Figure 23:
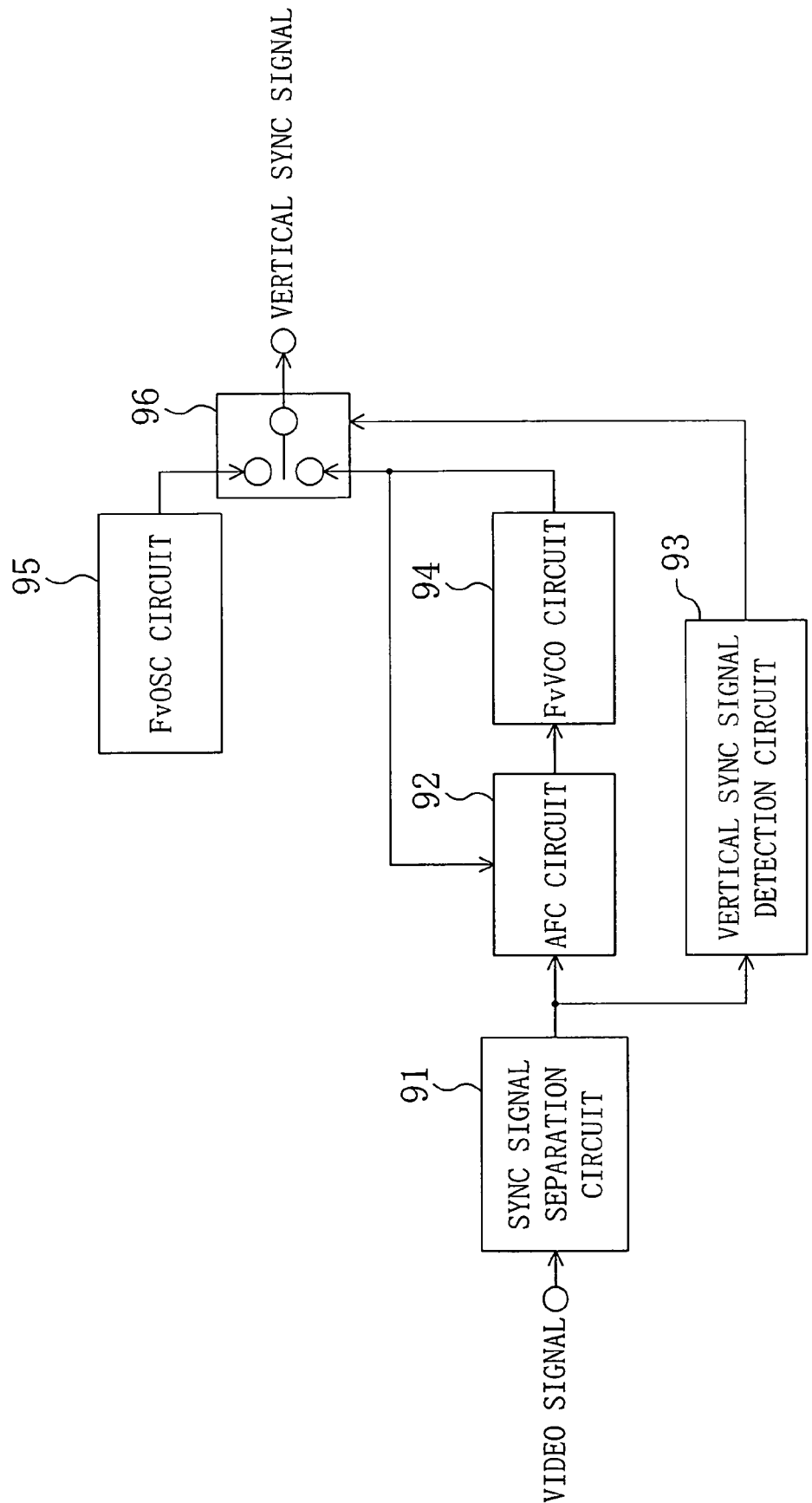
FIG. 23 is a block diagram of a conventional vertical sync signal generator.

When using a vertical sync signal output from the conventional vertical sync signal generator of FIG. 23, the write control circuit 51 determines the start position of each active time of the video signal based on the vertical sync signal having a roughly constant period, generates the write enable signal W_ENA, and writes data of the video signal into a frame memory. Therefore, addresses at which the data is written are deviated by several lines between the odd field and the even field. If the data is read as it is, images deviated vertically from each other as shown in FIG. 10(*b*) are alternately displayed.

In the video signal processor of this embodiment, in the case described above, the vertical sync signal generator 10 selects the vertical sync signal VS in place of the vertical sync signal AFCVS and outputs the selected signal as the vertical sync signal GVS. Therefore, the start position of each active time of the video signal can be correctly determined in both the odd field and the even field, and thus an invariably frame-synchronized video signal free from deviation between the fields as shown in FIG. 10(*c*) can be obtained.

The write clock WCL and the read clock RCL may be different clocks independent of each other or may be the same clock.

(Alteration to Embodiment 2)

Figure 11:
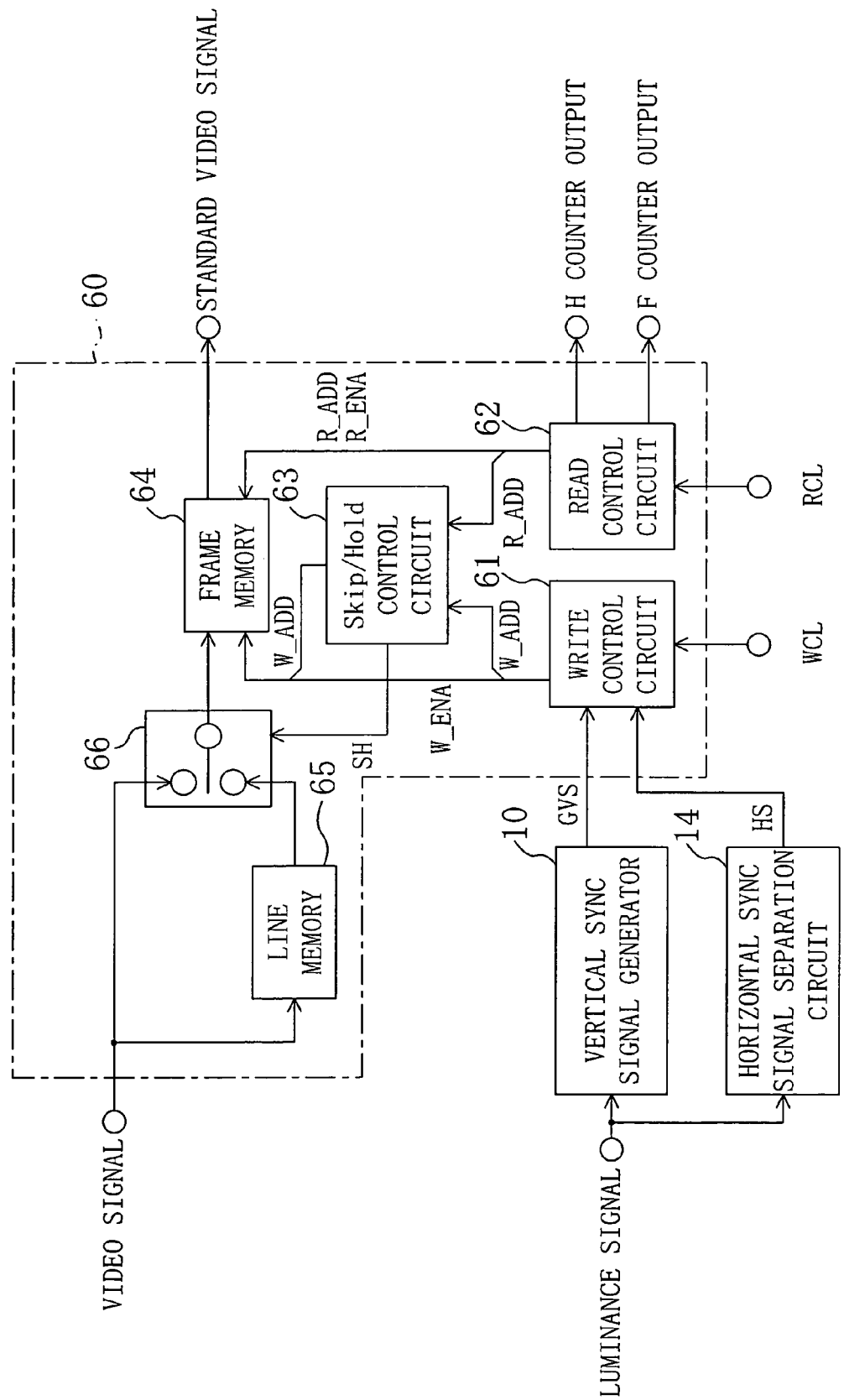
FIG. 11 is a block diagram of a video signal processor of an alteration to Embodiment 2 of the present invention.

FIG. 11 is a block diagram of a video signal processor of an alteration to Embodiment 2. The video signal processor of FIG. 11 includes a frame sync circuit 60 in place of the frame sync circuit 50 of the video signal processor of FIG. 7. The vertical sync signal generator 10 and the horizontal sync signal separation circuit 14 are the same as those of the video signal processor of FIG. 7, and therefore the description thereof is omitted here. The frame sync circuit 60 in FIG. 11 includes a write control circuit 61, a read control circuit 62, a skip/hold control circuit 63, a frame memory 64, a line memory 65 and a selector 66.

The write control circuit 61 is substantially the same as the write control circuit 51 except that the write selection signal W_SEL is not generated. The write control circuit 61 generates a write address W_ADD for write into the frame memory 64 and a write enable signal W_ENA based on the vertical sync signal GVS, the horizontal sync signal HS and the write clock WCL. The write control circuit 61 outputs the write address W_ADD to the skip/hold control circuit 63, and outputs the write enable signal W_ENA to the frame memory 64.

The read control circuit 62 receives the read clock RCL. The read control circuit 62, which is substantially the same as the read control circuit 52, outputs the output of an F counter to the skip/hold control circuit 63 and the frame memory 64 as a read address R_ADD, and outputs a read enable signal R_ENA to the frame memory 64.

The skip/hold control circuit 63 generates a skip/hold control signal SH for controlling input of data into the frame memory 64 to ensure that, during read of a signal of a given frame from the frame memory 64, read of a signal of a frame other than the given frame caused by address overtaking does not occur, that is, to ensure that no discontinuity of an image occurs in a read frame, and outputs the signal to the selector 66.

The line memory 65 receives a video signal. The line memory 65 can store data of 20 lines of the video signal (including data outside the active times of the video signal), for example, and operates as a FIFO buffer in which a signal input first is output first. In other words, the line memory 65 delays the input video signal by a time corresponding to 20 lines and outputs the delayed signal to the selector 66. The selector 66 also receives the video signal directly. The capacity of the line memory 65 is not limited to 20 lines.

The selector 66 selects either one of the video signal and the output of the line memory 65 according to the skip/hold control signal SH, and outputs the result to the frame memory 64. Assume herein that the selector 66 selects the video signal when the skip/hold control signal SH is "L" and selects the output of the line memory 65 when it is "H".

The frame memory 64 stores the output of the selector 66 at the write address is W_ADD when the write enable signal W_ENA is active. Also, the frame memory 64 reads data at the read address R_ADD and outputs the data as a standard video signal when the read enable signal R_ENA is active.

Figures 12A, 12B:
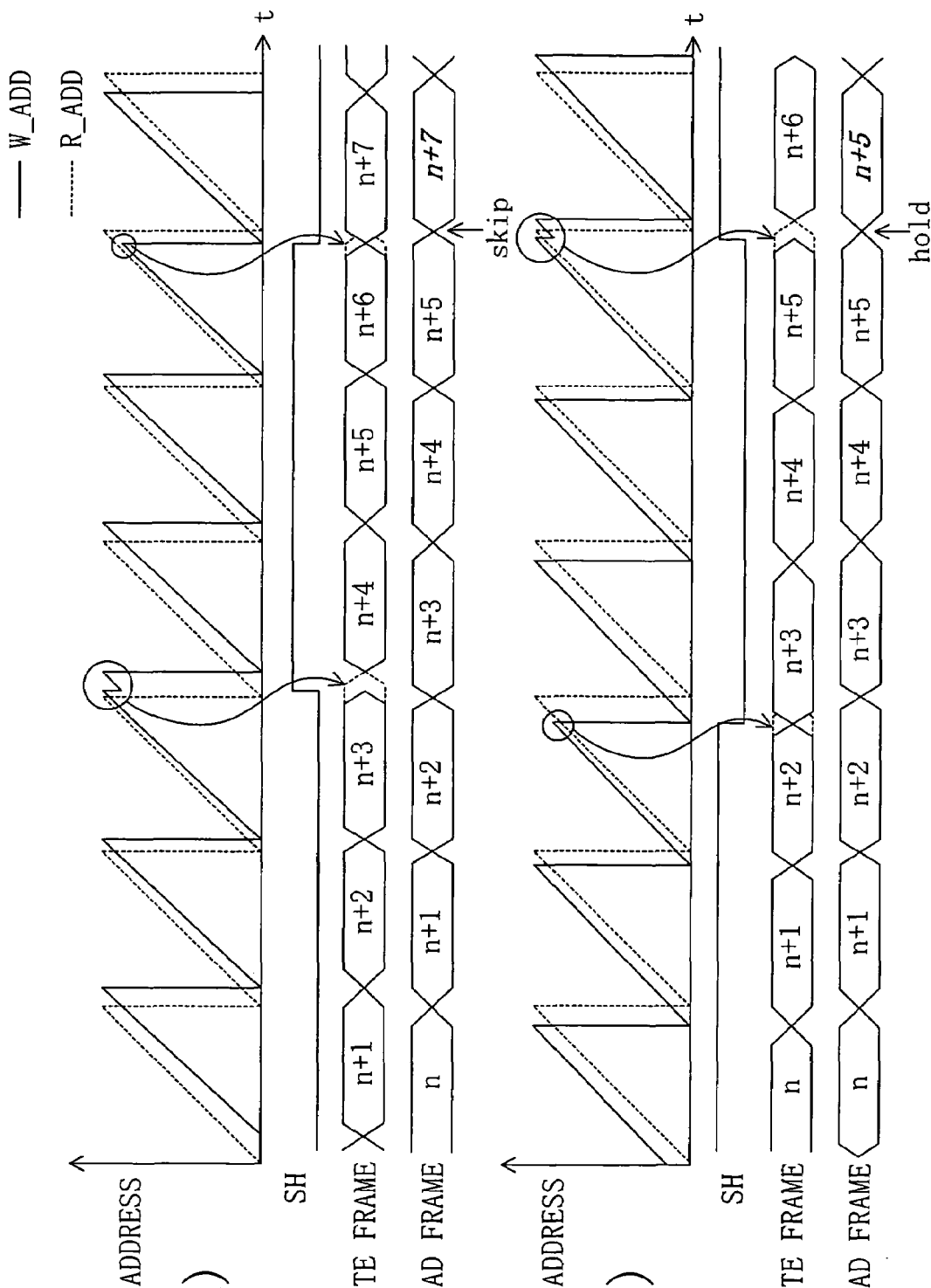
FIG. 12(a) is a graph demonstrating operation of a skip/hold control circuit in FIG. 11 in the case that write operation overtakes read operation.
FIG. 12(b) is a graph demonstrating operation of the skip/hold control circuit in FIG. 11 in the case that read operation overtakes write operation.

FIG. 12(*a*) is a graph demonstrating operation of the skip/hold control circuit 63 in FIG. 11 in the case that the write operation overtakes the read operation. FIG. 12(*b*) is a graph demonstrating operation of the skip/hold control circuit 63 in FIG. 11 in the case that the read operation overtakes the write operation. In the frame sync circuit 60, the write operation and the read operation are conducted independently of each other asynchronously.

Figure 13:
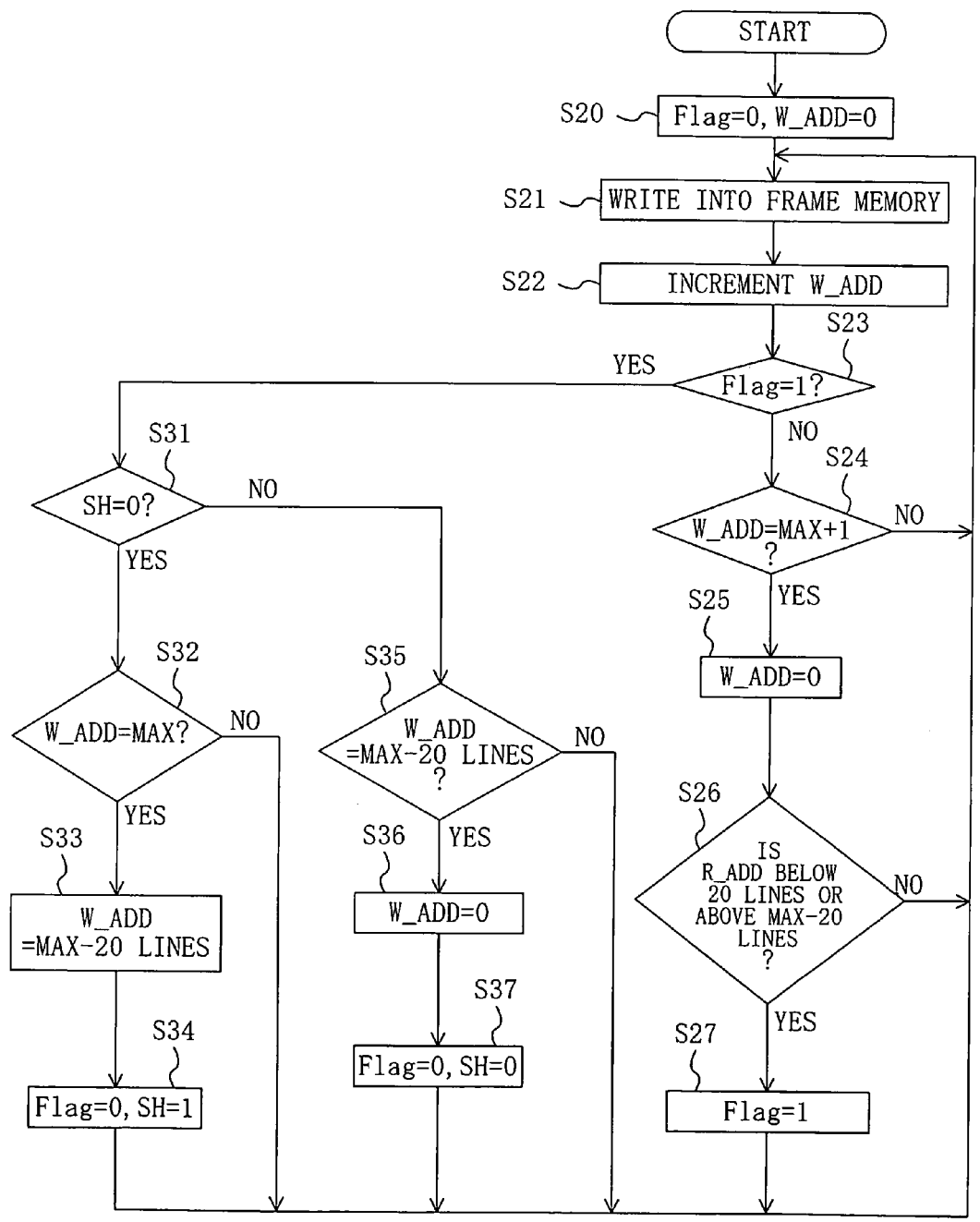
FIG. 13 is a flowchart showing a flow of processing by a frame sync circuit in FIG. 11.

FIG. 13 is a flowchart showing a flow of processing by the frame sync circuit 60 in FIG. 11. The operation of the frame sync circuit 60 will be described with reference to FIGS. 12(*a*), 12(*b*) and 13.

First, in step S20, the skip/hold control circuit 63 sets flag=0 and the write control circuit 61 sets write address W_ADD=0. In step S21, the write control circuit 61 asserts the write enable signal W_ENA, to allow the output of the selector 66 to be written into the frame memory 64 at the write address W_ADD (assume that SH=0). In step S22, the write control circuit 61 increments the write address W_ADD by one.

In step S23, the skip/hold control circuit 63 determines whether or not flag=1. If flag=1, the step proceeds to step S31. Otherwise, the step proceeds to step S24. In step S24, the skip/hold control circuit 63 determines whether or not write address W_ADD=MAX+1. If this equation is satisfied, the step proceeds to step S25. Otherwise, the step returns to step S21. The value MAX, which is the maximum the write address W_ADD can normally take, is 1716×525 for a signal of the NTSC system, for example.

In FIGS. 12(*a*) and 12(*b*), since a range of addresses greater than MAX–20-odd lines corresponds to a portion outside the active time of the video signal, data in this range is not written into the frame memory 64.

In step S25, the skip/hold control circuit 63 sets write address W_ADD=0. In step S26, the skip/hold control circuit 63 determines whether or not the read address R_ADD satisfies the condition of being smaller than 20 lines or greater than MAX—20 lines. Addresses of 20 lines are 1716×20 for a signal of the NTSC system. The reason for using 20 lines is that the capacity of the line memory 65 is 20 lines. If the condition is satisfied, the process proceeds to step S27. Otherwise, the process returns to step S21.

In step S27, the skip/hold control circuit 63 sets flag=1, and the process returns to step S21. Flag=1 indicates that the difference between the write address W_ADD and the read address R_ADD is small, and thus the possibility that the write operation may overtake the read operation or the read operation may overtake the write operation is high.

In step S31, the skip/hold control circuit 63 determines whether or not skip/hold control signal SH=0 (that is, "L"). If SH=0, that is, in the case that the selector 66 selects the video signal, the process proceeds to step S32. Otherwise, the process proceeds to step S35. In step S32, the skip/hold control circuit 63 determines whether or not write address W_ADD=MAX. If this equation is satisfied, the process proceeds to step S33. Otherwise, the process returns to step S21.

The skip/hold control circuit 63 sets write address W_ADD=MAX—20 in step S33 and sets flag=0 and SH=1 (that is, "H") in step S34, and then the process returns to step S21. That is, the selector 66 is directed to select the output of the line memory 65. Since the output of the line memory 65 is behind the video signal by 20 lines, the write address W_ADD is set behind by 20 lines (see the end of write of frame n+3 in FIG. 12(*a*) and the end of write of frame n+5 in FIG. 12(*b*)).

In step S35, the skip/hold control circuit 63 determines whether or not write address W_ADD=MAX—20 lines. If this equation is satisfied, the step proceeds to step S36. Otherwise, the process returns to step S21. The skip/hold control circuit 63 sets write address W_ADD=0 in step S36 and sets flag=0 and SH=0 in step S37, and then the process returns to step S21. That is, the selector 66 is directed to select the video signal. Since the video signal is ahead of the output of the line memory 65 by 20 lines, write address W_ADD=0 is set. This is equivalent to setting forward the write address W_ADD by 20 lines (see the end of write of frame n+6 in FIG. 12(*a*) and the end of write of frame n+2 in FIG. 12(*b*)). Since the range of addresses greater than MAX—20 lines corresponds to a portion outside the active time of the video signal, data in this range is not written in the frame memory 64. Therefore, write address W_ADD=0 can be set with no influence to display.

In the case that the write address W_ADD increments faster than the read address R_ADD as in FIG. 12(*a*), the write address W_ADD overtakes the read address R_ADD when the write address W_ADD is set forward by 20 lines (at the end of write of frame n+6). In this event, frame n+7 is read from the frame memory 64 (frame n+6 is skipped).

In the case that the read address R_ADD increments faster than the write address W_ADD as in FIG. 12(*b*), the read address R_ADD overtakes the write address W_ADD when the write address W_ADD is set back by 20 lines (at the end of write of frame n+5). In this event, frame n+5 is read again from the frame memory 64 (frame n+5 is held).

As described above, in the video signal processor of FIG. 11, in the case that the rate at which the write address W_ADD changes is different from the rate at which the read address R_ADD changes, causing address overtaking, it is ensured that during read of a signal of a given frame from the frame memory 64, read of a signal of a frame other than the given frame caused by address overtaking does not occur. Thus, discontinuity of an image in a read frame is prevented.

In the video signal processor of FIG. 11, either one of the video signal and the output of the line memory 65 is selected and written into the frame memory 64. Alternately, the output of the frame memory 64 may be input into the line memory, and either one of the output of the frame memory 64 and the output of the line memory may be selected and output as the standard video signal. In this case, the skip/hold control circuit should control the read address R_ADD, not the write address W_ADD, in the manner described above.

In Embodiment 2 and the alteration to Embodiment 2, the write address W_ADD and the read address R_ADD were described to increment from 0 sequentially and return to 0 once reaching the maximum. Any order other than this may be adopted as long as both the write address W_ADD and the read address R_ADD change in the same order. For example, the number may decrement from the maximum sequentially and return to the maximum once reaching 0.

(Embodiment 3)

Figure 14:
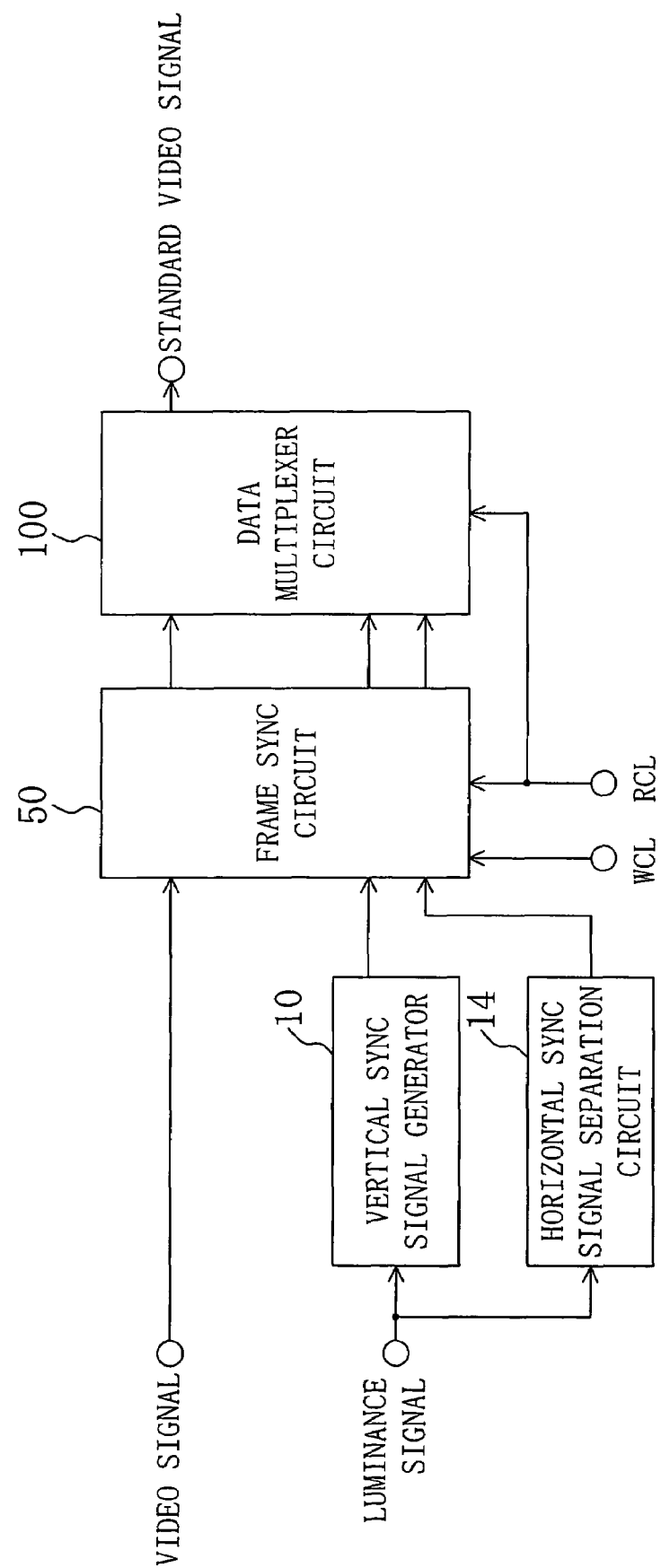
FIG. 14 is a block diagram of a video signal processor of Embodiment 3 of the present invention.

FIG. 14 is a block diagram of a video signal processor of Embodiment 3 of the present invention. The video signal processor of FIG. 14 includes the vertical sync signal generator 10, the horizontal sync signal separation circuit 14, the frame sync circuit 50 and a data multiplexer circuit 100. The vertical sync signal generator 10 is substantially the same as that described in Embodiment 1, and the horizontal sync signal separation circuit 14 and the frame sync circuit 50 are substantially the same as those described in Embodiment 2. Detailed description thereof is therefore omitted here.

The data multiplexer circuit 100 receives the read clock RCL as well as the standard video signal, the H counter output and the F counter output from the frame sync circuit 50. The data multiplexer circuit 100 adds a data group defined by a digital video signal standard to the standard video signal output from the frame sync circuit 50, and outputs standard video data completely conforming to the standard.

Assume herein that the standard video signal output from the frame sync circuit 50 is a signal of the NTSC system, in which a luminance signal Y and two color-difference signals Cr and Cb are multiplexed at a ratio of Y:Cr:Cb=4:2:2 at a read clock of 27 MHz. The luminance signal Y and the two color-difference signals Cr and Cb are respectively 8-bit data. One frame of the video signal is composed of 1716 samples horizontally and 525 lines vertically. Among such data, data in the active times of the video signal includes 1440 samples horizontally and 480 lines vertically.

Assume that the standard video data output from the video signal processor of FIG. 14 conforms to the digital video signal standard Rec. ITU-R BT.656-2 (hereinafter, referred to as REC. 656).

Figures 15A, 15B:
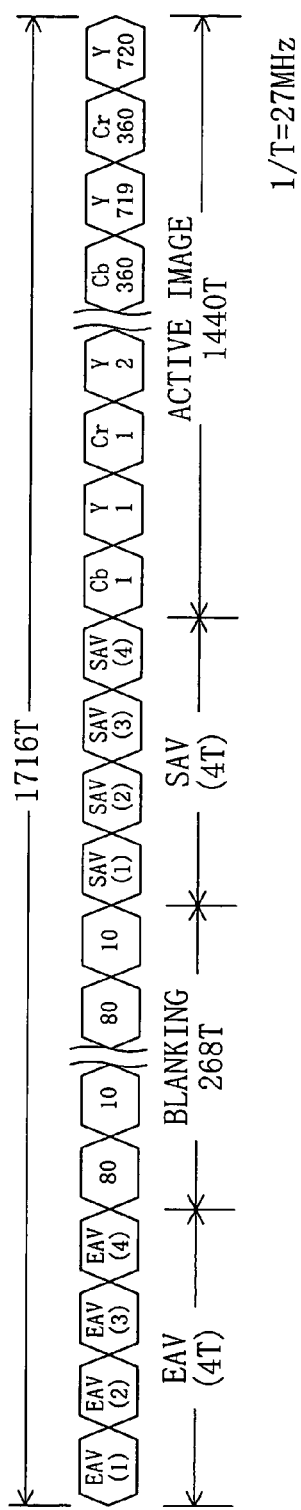
FIG. 15(a) is a view showing 1716 pieces of data for one line according to the digital video signal standard Rec. 656.
FIG. 15(b) is a view demonstrating EAV and SAV according to the digital video signal standard Rec. 656.

FIG. 15(a) is a view illustrating 1716 pieces of data of one line according to the digital video signal standard Rec. 656. One line includes, from the head, 4 T of end mark data (EAV), 268 T of blanking data, 4 T of start mark data (SAV) and 1440 T of active image data (T denotes the sampling period in sampling at 27 MHz). As the blanking data, 10 h (h denotes hexadecimal notation) is allocated to the luminance signal and 80 h to the color-difference signals. During vertical blanking intervals, even the active image data includes repetition of 80 h (color-difference) and 10 h (luminance).

FIG. 15(b) is a view demonstrating EAV and SAV according to the digital video signal standard Rec. 656. Data of EAV and SAV are different among lines. In the NTSC system, data as shown in FIG. 15(b) are used for 1 to 525 lines.

The F counter counts the line number from 1 to 525 vertically in a cyclic manner, and the H counter counts the data number from 1 to 1716 horizontally in a cyclic manner. The standard video signal output from the frame sync circuit 50 completely synchronizes with the F counter output and the H counter output. The data multiplexer circuit 100 decodes the F counter output and the H counter output, and selects fixed values stored in a read-only memory (ROM) table during the EAV, SAV and blanking times while selecting the standard video signal during the active image time, and outputs the result.

As described above, in the video signal processor of FIG. 14, standard video data completely conforming to a digital video signal standard can be obtained with the considerably simple circuit configuration.

The frame sync circuit 60 in FIG. 11 may be used in place of the frame sync circuit 50 in FIG. 7.

(Embodiment 4)

Figure 16:
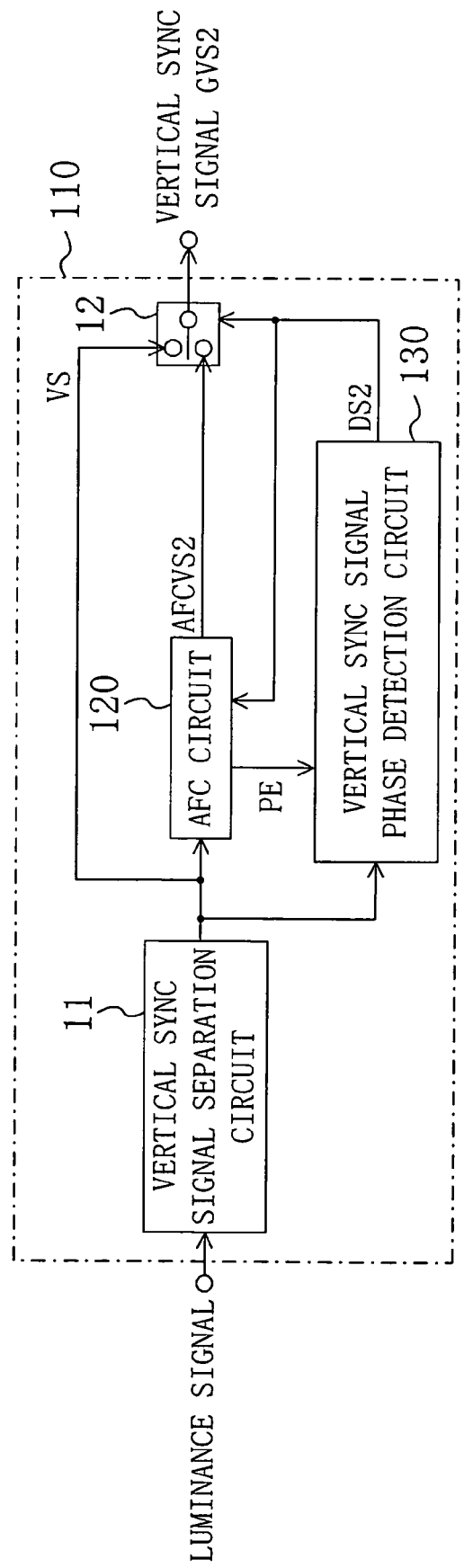
FIG. 16 is a block diagram of a vertical sync signal generator of Embodiment 4 of the present invention.

FIG. 16 is a block diagram of a vertical sync signal generator of Embodiment 4 of the present invention. A vertical sync signal generator 110 of FIG. 16 includes a vertical sync signal separation circuit 11, an AFC circuit 120, a vertical sync signal phase detection circuit 130 and a selector 12.

Assume that a luminance signal input into the vertical sync signal generator 110 of FIG. 16 is one separated from a video signal of the NTSC system and that a clock having a frequency fs is input into the vertical sync signal separation circuit 11, the AFC circuit 120, the vertical sync signal phase detection circuit 130 and the selector 12.

The vertical sync signal separation circuit 11 separates a first vertical sync signal VS superimposed on the input luminance signal during each vertical blanking interval, and outputs the separated signal to the AFC circuit 120, the vertical sync signal phase detection circuit 130 and the selector 12. The AFC circuit 120, provided with a PLL, generates a second vertical sync signal AFCVS2 that roughly synchronizes with the vertical sync signal VS and has a repeat frequency corresponding with the average repeat frequency of the vertical sync signal VS, and outputs the generated signal to the selector 12. The vertical sync signal phase detection circuit 130 outputs a decision signal DS2 corresponding to the state of the vertical sync signal VS to the selector 12. The selector 12 selects either one of the vertical sync signal VS and the vertical sync signal AFCVS2 according to the decision signal DS2, and outputs the result as a vertical sync signal GVS2.

Figure 17:
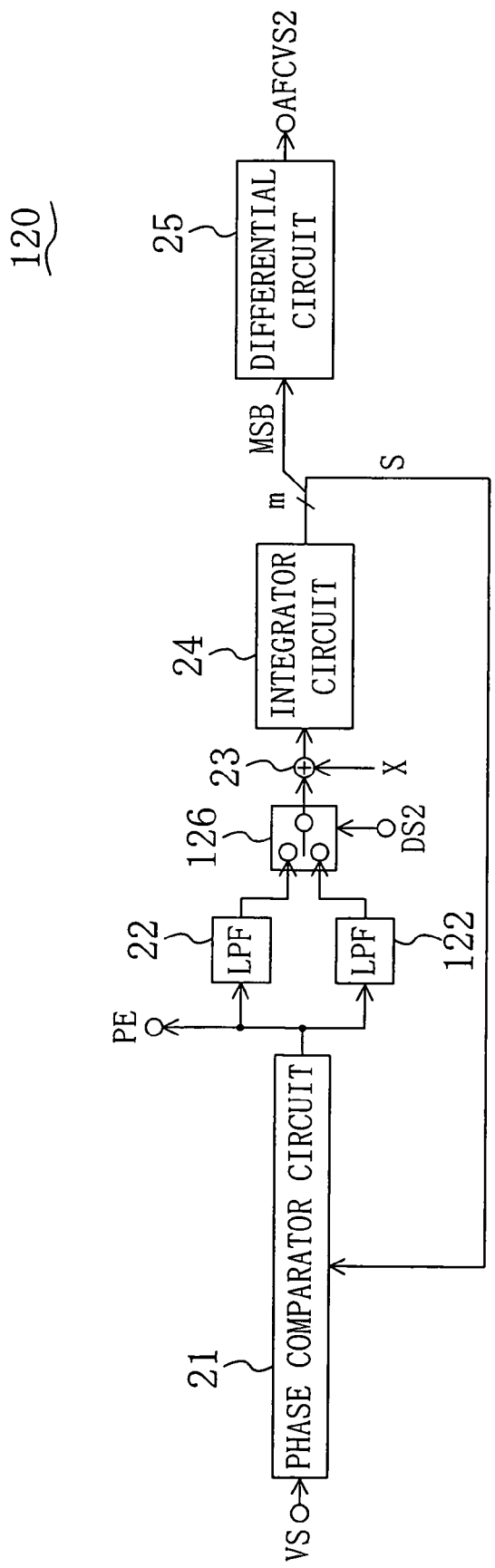
FIG. 17 is a block diagram of an example of an AFC circuit in FIG. 16.

FIG. 17 is a block diagram of an example of the AFC circuit 120 in FIG. 16. As shown in FIG. 17, the AFC circuit 120 includes a phase comparator circuit 21, LPFs 22 and 122, an adder circuit 23, an integrator circuit 24, a differential circuit 25 and a selector (filter selector) 126.

The phase comparator circuit 21, which is substantially the same as that described with reference to FIG. 3, samples an output S of the integrator circuit 24 at the timing of each pulse of the vertical sync signal VS, subtracts the sampled value from value D/2, for example, and outputs the result to the LPFs 22 and 122 and the vertical sync signal phase detection circuit 130 as a phase error signal PE.

The LPFs 22 and 122 are complete integral type LPFs, for example. The LPF 22 allows passing of only a component having a frequency equal to or less than a given 5 frequency out of the output of the phase comparator circuit 21, and outputs the result to the selector 126. The LPF 122 allows passing of only a component having a frequency equal to or less than a given frequency that is higher than the given frequency for the LPF 22, out of the output of the phase comparator circuit 21, and outputs the result to the selector 126. That is, the LPF 122 is faster in transient response than the LPF 22.

The selector 126, which receives the decision signal DS2 as a control signal, selects either one of the output of the LPF 22 and the output of the LPF 122 according to the decision signal DS2 and outputs the result to the adder circuit 23. The adder circuit 23, the integrator circuit 24 and the differential circuit 25 are substantially the same as those described with reference to FIG. 3, and therefore detailed description thereof is omitted here. The differential circuit 25 outputs the resultant vertical sync signal AFCVS2 to the selector 12.

In the event that the difference in phase between the vertical sync signal VS and the vertical sync signal AFCVS2 is great, such as during power-on, during switching of the scene and during switching of the input video signal, it is desirable for the selector 126 to select the output of the LPF 122 that is faster in transient response than the LPF 22, so that the phase of the vertical sync signal AFCVS2 swiftly comes close to the phase of the vertical sync signal VS.

However, in the case that the period of the vertical sync signal VS is roughly constant but the timing of the vertical sync signal VS varies back and forth repeatedly due to noise and the like, the phase error signal PE output from the phase comparator circuit 21 passes through the LPF 122 and is input into the integrator circuit 24 even if the variation is as small as several clocks. As a result, the vertical sync signal AFCVS2 is no more stable. In this case, it is necessary for the selector 126 to select the output of the LPF 22 that is slower in transient response than the LPF 122 according to the decision signal DS2, to secure stable drawing of the vertical sync signal AFCVS2 into synchronization.

To permit the selector 126 to select as described above, the vertical sync signal phase detection circuit 130 should output the decision signal DS2 indicating that the vertical sync signal AFCVS2 is in the lockout state or lock-in state.

The lockout state as used herein refers to the state that the vertical sync signal VS and the vertical sync signal AFCVS2 are out of phase with each other, in which the phase error signal PE is equal to or higher than a predetermined lockout level for a predetermined time period. The lock-in state refers to the state that the vertical sync signal VS and the vertical sync signal AFCVS2 are not out of phase with each other, in which the phase error signal PE is equal to or lower than a predetermined lock-in level (value corresponding to 1H, for example) for a predetermined time period.

Figure 18:
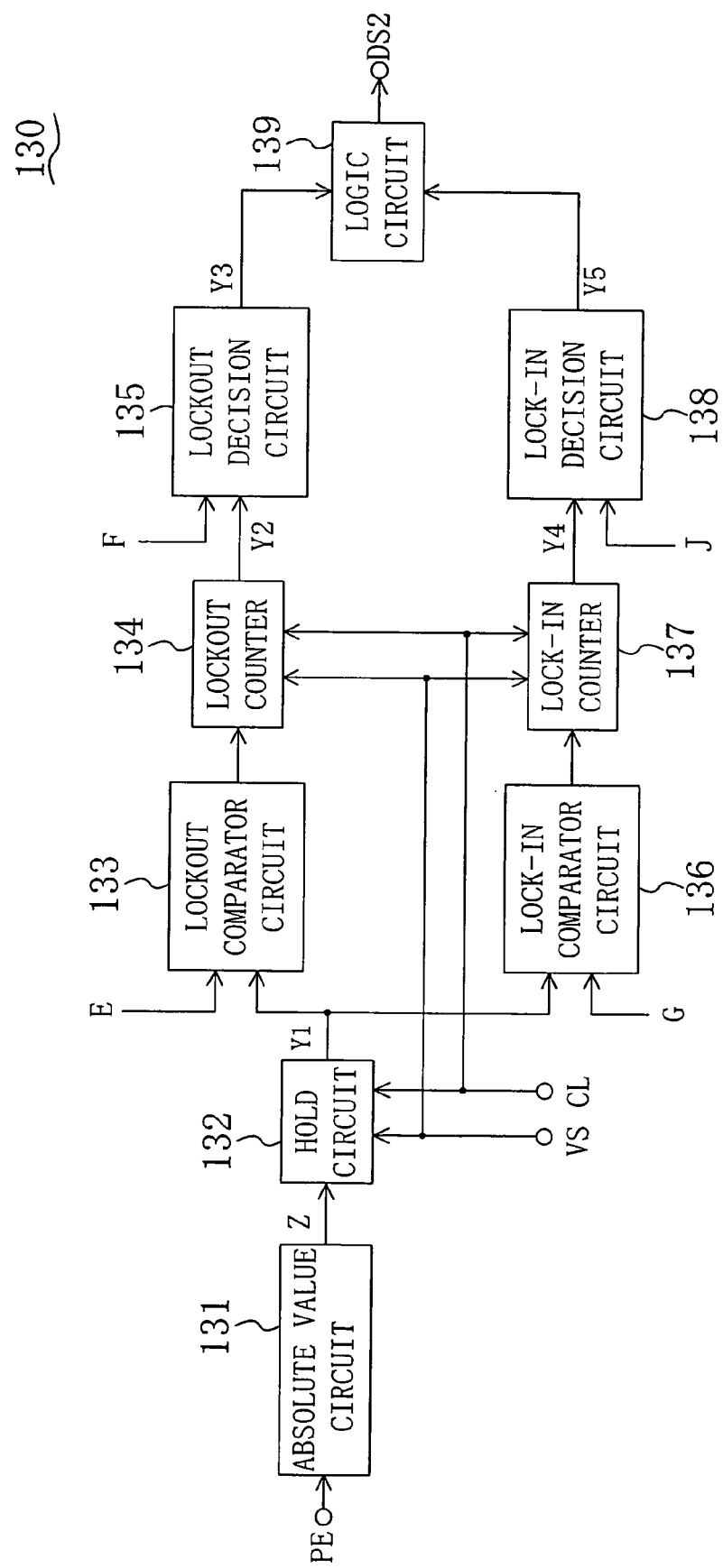
FIG. 18 is a block diagram of an example of a vertical sync signal phase detection circuit in FIG. 16.

FIG. 18 is a block diagram of an example of the vertical sync signal phase detection circuit 130 in FIG. 16. As shown in FIG. 18, the vertical sync signal phase detection circuit 130 includes an absolute value circuit 131, a hold circuit 132, a lockout comparator circuit 133, a lockout counter 134, a lockout decision circuit 135, a lock-in comparator circuit 136, a lock-in counter 137, a lock-in decision circuit 138 and a logic circuit 139.

The absolute value circuit 131 receives the phase error signal PE output from the phase comparator circuit 21. The hold circuit 132, the lockout counter 134 and the lock-in counter 137 receive the vertical sync signal VS and the clock CL having a frequency fs.

The absolute value circuit 131 obtains the absolute value Z of the phase error signal PE and outputs the result to the hold circuit 132. The hold circuit 132 latches the output Z of the absolute value circuit 131 when receiving a pulse of the vertical sync signal VS in synchronization with the clock CL, and holds the latched value until receiving the next pulse of the vertical sync signal VS and further receiving a pulse of the clock CL. The hold circuit 132 outputs the held value Y1 to the lockout comparator circuit 133 and the lock-in comparator circuit 136.

The lockout comparator circuit 133 compares the output Y1 of the hold circuit 132 with a constant E, and outputs the result to the lockout counter 134. The output of the lockout comparator circuit 133 is "1" when Y1≧E and otherwise "0", for example.

The lockout counter 134 increments in synchronization with the clock CL when lo receiving a pulse of the vertical sync signal VS in the case that the output of the lockout comparator circuit 133 is "1" (Y1≧E), and holds the value until receiving the next pulse of the vertical sync signal VS and further receiving a pulse of the clock CL. The lockout counter 134 stops counting once its count value Y2 reaches the maximum countable value.

The lockout counter 134 resets the count value to "0" in synchronization with the clock CL when receiving a pulse of the vertical sync signal VS in the case that the output of the lockout comparator circuit 133 is "0" (Y1<E). The lockout counter 134 outputs the count value Y2 to the lockout decision circuit 135.

The lockout decision circuit 135 compares the count value Y2 of the lockout counter 134 with a constant F, to obtain the comparison result of "1" when Y2≧F and otherwise "0", for example, as a lockout signal. The lockout decision circuit 135 then differentiates the lockout signal to generate a lockout differential pulse Y3 indicating the timing of the leading edge of the pulse of the lockout signal, and outputs the result to the logic circuit 139.

The lock-in comparator circuit 136 compares the output Y1 of the hold circuit 132 with a constant G, and outputs the result to the lock-in counter 137. The output of the lock-in comparator circuit 136 is "1" when Y1≦G and otherwise "0", for example.

The lock-in counter 137 increments in synchronization with the clock CL when receiving a pulse of the vertical sync signal VS in the case that the output of the lock-in comparator circuit 136 is "1" (Y1≦G), and holds the value until receiving the next pulse of the vertical sync signal VS and further receiving a pulse of the clock CL. The lock-in counter 137 stops counting once its count value Y4 reaches the maximum countable value. The lock-in counter 137 resets the count value to "0" in synchronization with the clock CL when receiving a pulse of the vertical sync signal VS in the case that the output of the lock-in comparator circuit 136 is "0" (Y1>G). The lockout counter 137 outputs the count value Y4 to the lock-in decision circuit 138.

The lock-in decision circuit 138 compares the count value Y4 of the lock-in counter 137 with a constant J, to obtain the comparison result of "1" when Y4≧J and otherwise "0", for example, as a lock-in signal. The lock-in decision circuit 138 then differentiates the lock-in signal to generate a lock-in differential pulse Y5 indicating the timing of the leading edge of the pulse of the lock-in signal, and outputs the result to the logic circuit 139.

The logic circuit 139 conducts logic operation of the output Y3 of the lockout decision circuit 135 and the output Y5 of the lock-in decision circuit 138, and outputs the result as the decision signal DS2. Specifically, the logic circuit 139 outputs "1" when receiving the lockout differential pulse Y3 from the lockout decision circuit 135, and "0" when receiving the lock-in differential pulse Y5 from the lock-in decision circuit 138. For example, the logic circuit 139 is a set-reset flipflop that is set with the lockout differential pulse Y3 and reset with the lock-in differential pulse Y5.

Figure 19:
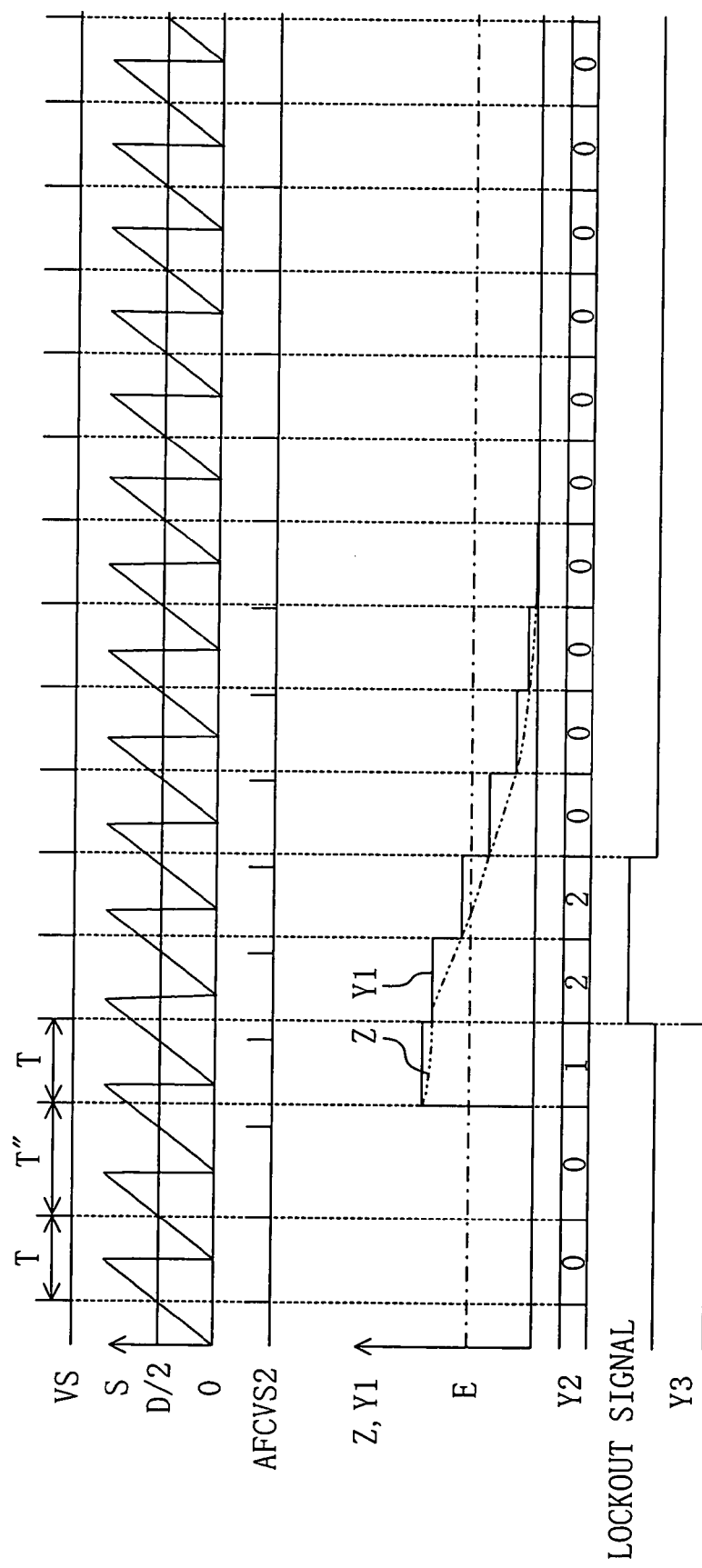
FIG. 19 is a timing chart showing generation of a lockout differential pulse by a vertical sync signal phase detection circuit in the case that a vertical sync signal VS goes out of phase largely.
Figure 20:
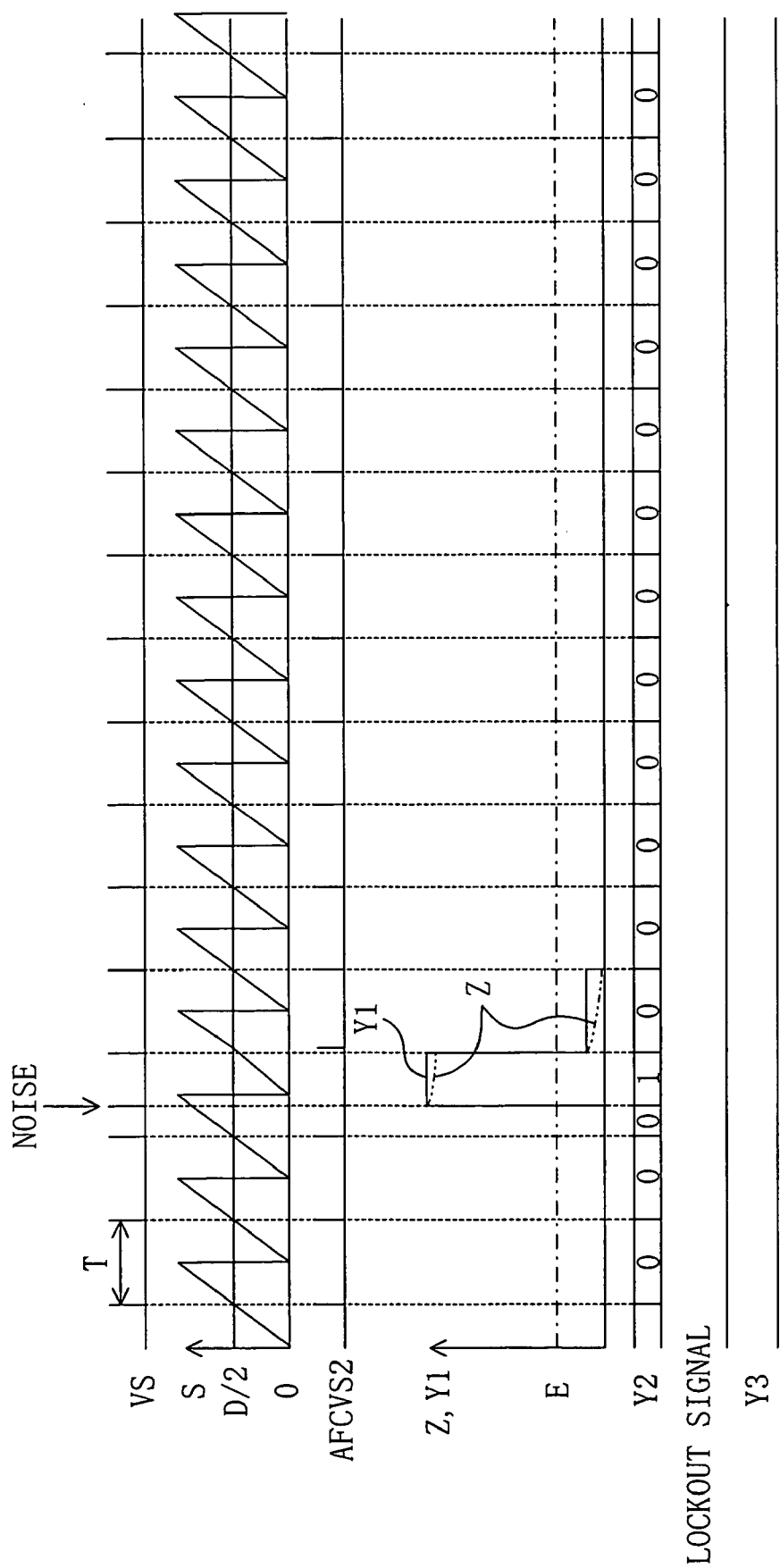
FIG. 20 is a timing chart showing operation of the vertical sync signal phase detection circuit in the case that noise enters the vertical sync signal VS.

FIG. 19 is a timing chart showing generation of the lockout differential pulse by the vertical sync signal phase detection circuit 130 in the case that the vertical sync signal VS goes out of phase largely. FIG. 20 is a timing chart showing operation of the vertical sync signal phase detection circuit 130 in the case that noise enters the vertical sync signal VS. The operation of the vertical sync signal phase detection circuit 130 will be described with reference to FIGS. 17 to 20.

In this embodiment, assume, as an example, that the clock frequency (sampling frequency) fs is 27 MHz, the period of the vertical sync signal VS in the steady state is T, the pulse interval of the vertical sync signal VS given when the signal goes out of phase largely is T", and the constant F is "2". Assume also that the AFC circuit 120 is in the steady state and the period of the vertical sync signal AFCVS2 output from the AFC circuit 120 is also T. Suppose the count value Y2 of the lockout counter 134 is "0" and the selector 126 selects the output of the LPF 22 having slower transient response.

When the phase error signal PE output from the AFC circuit 120 has a width of 36 bits, for example, the output Z of the absolute value circuit 131 can be any value in the range of $-2^{35}$ to $+2^{35}-1$. In this case, the constants E and G are set at 09c000000h and 04e000000h, respectively, for example.

The pulse interval of the vertical sync signal VS may momentarily be T" during power-on, scene switching and the like, as shown in FIG. 19. In this event, the phase comparator circuit 21 calculates and outputs the phase difference between the vertical sync signal VS and the vertical sync signal AFCVS2 as the phase error signal PE.

The absolute value circuit 131 obtains the absolute value of the phase error signal PE and outputs the result to the hold circuit 132. The hold circuit 132 latches the output Z of the absolute value circuit 131 at the timing of the vertical sync signal VS, holds the latched value and outputs the result (value Y1).

The lockout comparator circuit 133 determines that the output Y1 of the hold circuit 132 is larger than the lockout level E, and outputs "1" to the lockout counter 134. Receiving the output "1" of the lockout comparator circuit 133, the lockout counter 134 increments when receiving a pulse of the vertical sync signal VS and outputs "1".

The AFC circuit 120 makes the timing of the vertical sync signal AFCVS2 closer to the timing of the vertical sync signal VS in response to the phase error signal PE. Therefore, the absolute value of the phase error signal PE gradually decreases. Nevertheless, if Y1≧E is still satisfied when the next pulse of the vertical sync signal VS is input, the lockout counter 134 further increments and outputs "2" to the lockout decision circuit 135 as the count value Y2. The lockout counter 134 will no more increment once the count value Y2 reaches "2", for example.

Having the count value Y2 of "2" that is equal to the constant F, the lockout decision circuit 135 decides that it is in the lockout state and turns the lockout signal to "1". With the change of the lockout signal from "0" to "1", the lockout decision circuit 135 outputs the lockout differential pulse Y3 to the logic circuit 139, and the logic circuit 139 outputs "1" as the decision signal DS2. In response to this, the selector 126 selects the output of the LPF 122 having faster transient response. This makes the response of the AFC circuit 120 faster, and thus makes the change of the absolute value Z output from the absolute value circuit 131 faster.

Thereafter, when Y1<E is satisfied, the output of the lockout comparator circuit 133 becomes "0", and thus the lockout counter 134 resets the count value Y2 to "0". The lockout decision circuit 135 decides that it is not in the lockout state and turns the lockout signal to "0". The output Y1 of the hold circuit 132 continues decreasing toward "0".

As described above, when the lockout state is detected, the response of the AFC circuit 120 is made faster. This makes the timing of the vertical sync signal AFCVS2 match with the timing of the vertical sync signal VS swiftly.

The case shown in FIG. 20, in which the vertical sync signal VS momentarily goes out of phase largely due to noise entering the vertical sync signal VS, will be described. In this case, while the output Y1 of the hold circuit 132 momentarily becomes a large value, the part of the vertical sync signal VS other than the noise portion remains the steady state with the period T kept unchanged. Therefore, the timing of the vertical sync signal AFCVS2 output from the AFC circuit 120 does not change so much, and thus the phase error signal PE converges to "0" swiftly.

The lockout counter 134 increments the count value Y2 to "1", but is soon reset because Y1<E is resumed. Therefore, the lockout decision circuit 135 does not detect the lockout state and thus does not change the lockout signal, generating no lockout differential pulse Y3. The vertical sync signal generator 110 continue selecting and outputting the vertical sync signal AFCVS2 as the vertical sync signal GVS2. Thus, the vertical sync signal GVS2 is hardly affected by the noise.

If the constant F is set at "1", the lockout decision circuit 135 will decide that it is in the lockout state when noise enters the vertical sync signal VS. In this case, the vertical sync signal generator 110 will select and output the noise-contained vertical sync signal VS as the vertical sync signal GVS2. To avoid influence of noise, therefore, the constant F should be "2" or more.

Figure 21:
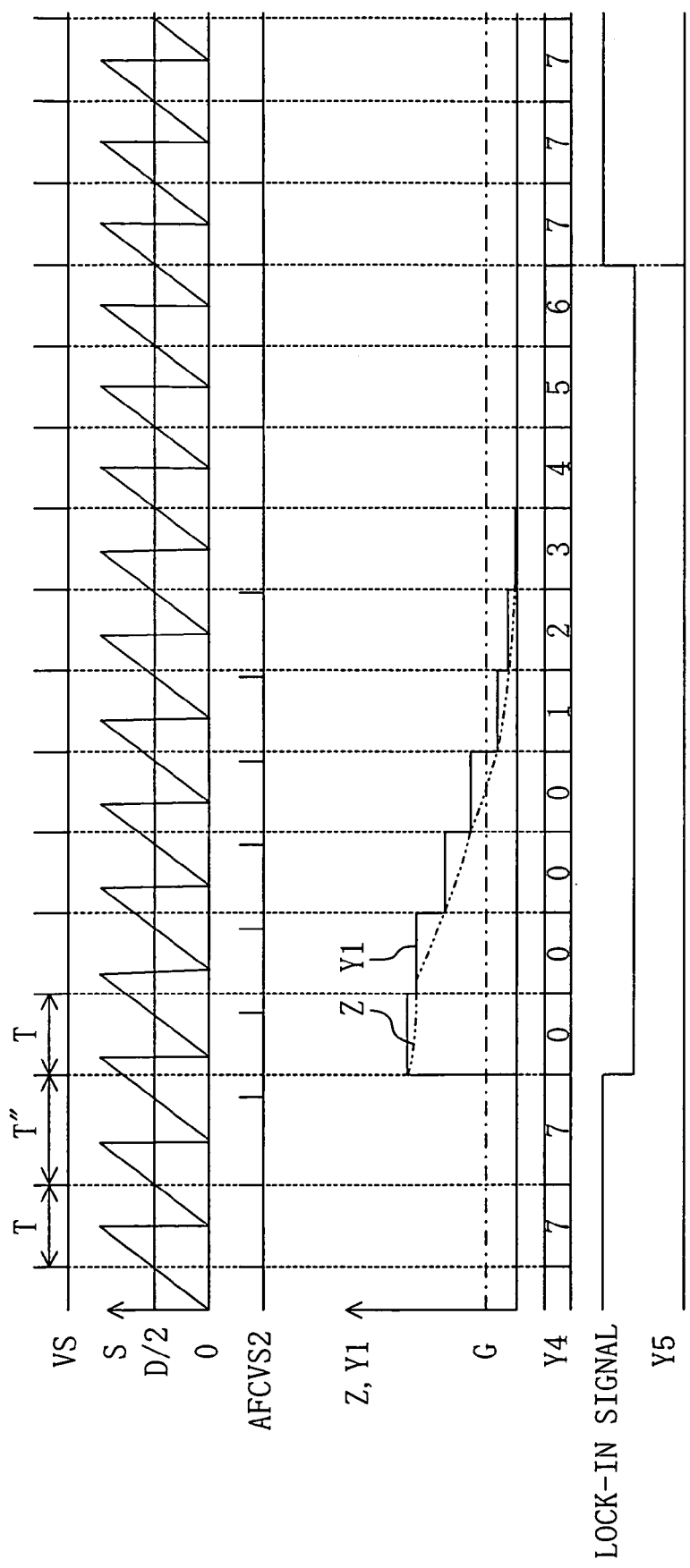
FIG. 21 is a timing chart showing generation of a lock-in differential pulse by the vertical sync signal phase detection circuit in the case that the vertical sync signal VS goes out of phase largely.

FIG. 21 is a timing chart showing generation of the lock-in differential pulse by the vertical sync signal phase detection circuit 130 in the case that the vertical sync signal VS goes out of phase largely. Assume, as an example, that the constant J is "7". As in the case of FIG. 19, the case that the pulse interval of the vertical sync signal VS momentarily becomes T" will be described. The output Y1 of the hold circuit 132 is the same as that in the case of FIG. 19.

Assume that the count value of the lock-in counter 137 is "7". When the pulse interval of the vertical sync signal VS becomes T" raising the output Y1 of the hold circuit 132 to a value equal to or larger than the lock-in level G, the lock-in comparator circuit 136 outputs "0" to the lock-in counter 137. The lock-in counter 137, receiving the output "0" of the lock-in comparator circuit 136, resets the count and outputs "0" as the count value Y4. Receiving the count value Y4 smaller than the constant J of "7", the lock-in decision circuit 138 decides that it is not in the lock-in state and turns the lock-in signal to "0".

The AFC circuit 120 makes the timing of the vertical sync signal AFCVS2 closer to the timing of the vertical sync signal VS in response to the phase error signal PE. Therefore, the absolute value of the phase error signal PE gradually decreases. When Y1<G is satisfied, the lock-in counter 137 increments every input of the pulse of the vertical sync signal VS, and outputs the count value Y4 to the lock-in decision circuit 138. The lock-in counter 137 will no more increment once the count value Y4 reaches "7", for example.

Having the count value Y4 of "7" that is equal to the constant J, the lock-in decision circuit 138 decides that it is in the lock-in state and turns the lock-in signal to "1". With the change of the lock-in signal from "0" to "1", the lock-in decision circuit 138 outputs the lock-in differential pulse Y5 to the logic circuit 139, and the logic circuit 139 outputs "0" as the decision signal DS2. In response to this, the selector 126 selects the output of the LPF 22 having slower transient response. This makes the operation of the AFC circuit 120 stable. With the decision signal DS of "0", the selector 12 in FIG. 16 selects and outputs the vertical sync signal AFCVS2 output from the AFC circuit 120 as the vertical sync signal GVS2.

As described above, when the lock-in state is detected, switching is made to use the LPF 22 having slower transient response, and thus the vertical sync signal AFCVS2 can be stabilized.

Figure 22:
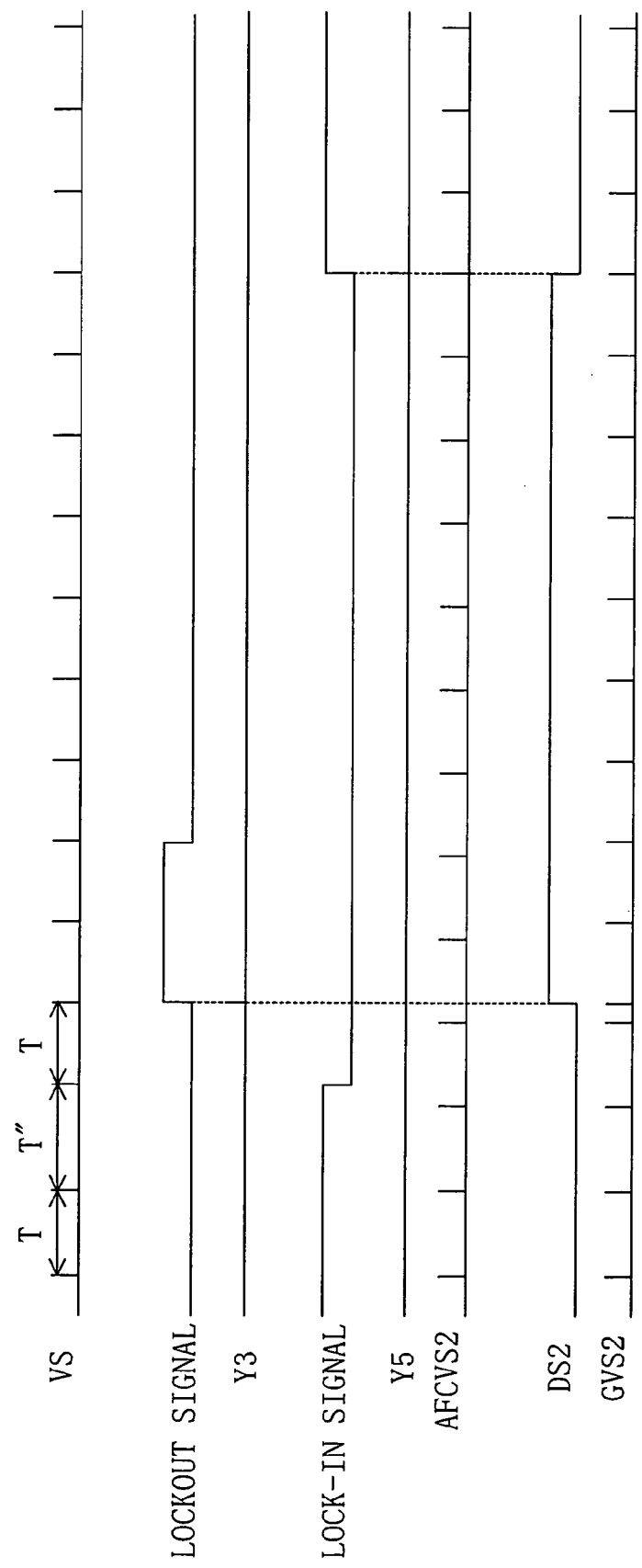
FIG. 22 is a timing chart showing operation of a logic circuit in FIG. 18.

FIG. 22 is a timing chart showing operation of the logic circuit 139 in FIG. 18. If the vertical sync signal VS goes out of phase largely and the phase error signal PE continues being large, the lockout decision circuit 135 decides that it is in the lockout state and outputs the lockout differential pulse Y3. The logic circuit 139 then turns the decision signal DS2 to "1". The selector 12 of the vertical sync signal generator 110, having the decision signal DS2 of "1", selects and outputs the vertical sync signal VS as the vertical sync signal GVS2. In this way, the vertical sync signal GVS2 free from being out of phase with the input luminance signal can be obtained.

Having the decision signal DS2 of "1", the selector 126 of the AFC circuit 120 selects the output of the LPF 122 having faster transient response. This makes the phase of the vertical sync signal AFCVS2 swiftly closer to the phase of the vertical sync signal VS, and thus makes the phase error signal PE small.

When the phase error signal PE remains small for a certain time period, the lock-in decision circuit 138 outputs the lock-in differential pulse Y5, and thus the logic circuit 139 turns the decision signal DS2 to "0". The selector 12 of the vertical sync signal generator 110, having the decision signal DS2 of "0", selects and outputs the vertical sync signal AFCVS2 as the vertical sync signal GVS2. Since the phase difference between the vertical sync signal AFCVS2 and the vertical sync signal VS is very small at this time, there will be no disorder of the vertical sync signal GVS2 during the switching of the selector 12.

Having the decision signal DS2 of "0", the selector 126 of the AFC circuit 120 selects the output of the LPF 22 having slower transient response. Therefore, the vertical sync signal AFCVS2 having a stable period can be obtained as the vertical sync signal GVS2.

As described above, the vertical sync signal generator of this embodiment outputs the vertical sync signal AFCVS during normal operation, and outputs the vertical sync signal VS, in place of the vertical sync signal AFCVS, when detecting that the vertical sync signal VS and the vertical sync signal AFCVS2 are out of phase with each other, during power-on, scene switching and the like. Therefore, during normal operation, a vertical sync signal stable in frequency and free from pulse missing can be provided. In addition, in the case that the vertical sync signal VS and the vertical sync signal AFCVS2 are out of phase with each other, the LPF having faster transient response is used, so that the vertical sync signal AFCVS2 can be swiftly drawn into synchronization.

In the embodiments described above, the video signal of the NTSC system was used. However, the present invention can also be applied to video signals of other systems.

The invention claimed is:

1. A vertical sync signal generator comprising:
   a vertical sync signal separation circuit for separating a vertical sync signal of an input luminance signal and outputting the separated signal as a first vertical sync signal;
   an automatic frequency control circuit for receiving the first vertical sync signal, generating a second vertical sync signal having a repeat frequency corresponding with an average repeat frequency of the first vertical sync signal, and outputting the generated signal;
   a vertical sync signal phase detection circuit for detecting whether or not the first vertical sync signal has two different periods repeated alternately, and outputting the detection result as a decision signal; and
   a selector for receiving the first and second vertical sync signals, selecting the first vertical sync signal when the decision signal indicates that the first vertical sync signal has two different periods repeated alternately and otherwise selecting the second vertical sync signal, and outputting the selected signal.

2. The vertical sync signal generator of claim 1, wherein the automatic frequency control circuit comprises:
   an integrator circuit of m bits (m is a natural number) for accumulating input values;
   a phase comparator circuit for sampling an output of the integrator circuit at the timing of the first vertical sync signal and outputting a difference between a sampled value and a predetermined value;
   a low pass filter for allowing passing of a low-frequency component out of the output of the phase comparator circuit;
   an adder circuit for adding a constant to an output of the low pass filter and outputting the result to the integrator circuit; and
   a differential circuit for differentiating the most significant bit of the integrator circuit and outputting the second vertical sync signal at the timing of the resultant edge.

3. The vertical sync signal generator of claim 1, wherein the vertical sync signal phase detection circuit comprises:
   a V period counter reset at the timing of the first vertical sync signal, for counting the number of pulses of a clock and outputting the count value;
   a first hold circuit for latching the output of the V period counter at the timing of the first vertical sync signal, outputting the latched value, and holding the output until next latching;
   a first subtractor circuit for calculating a difference between the output of the V period counter and the output of the first hold circuit and outputting the result;
   a first absolute value circuit for obtaining an absolute value of the output of the first subtractor circuit and outputting the result;
   a second hold circuit for latching the output of the first absolute value circuit at the timing of the first vertical sync signal, outputting the latched value, and holding the output until next latching;
   a second subtractor circuit for calculating a difference between the output of the first absolute value circuit and the output of the second hold circuit and outputting the result;
   a second absolute value circuit for obtaining an absolute value of the output of the second subtractor circuit and outputting the result;
   a first comparator circuit for comparing the output of the first absolute value circuit with a first constant and outputting the result;

a second comparator circuit for comparing the output of the second absolute value circuit with a second constant and outputting the result; and a logic circuit for conducting logic operation of the output of the first comparator circuit and the output of the second comparator circuit and outputting the result as the decision signal.

4. A video signal processor comprising:

a vertical sync signal generator;

a horizontal sync signal separation circuit for separating a horizontal sync signal of an input luminance signal and outputting the separated signal; and a frame sync circuit having a frame memory, for generating a write address in a predetermined order based on an output of the vertical sync signal generator, the horizontal sync signal and a write clock, and writing an input video signal into the frame memory according to the write address, as well as generating a read address in the same order as the order of the write address based on a read clock, reading the signal from the frame memory according to the read address, and outputting the read signal as a standard video signal, wherein the vertical sync signal generator comprises:

a vertical sync signal separation circuit for separating a vertical sync signal of the input luminance signal and outputting the separated signal as a first vertical sync signal;

an automatic frequency control circuit for receiving the first vertical sync signal, generating a second vertical sync signal having a repeat frequency corresponding with an average repeat frequency of the first vertical sync signal, and outputting the generated signal;

a vertical sync signal phase detection circuit for detecting whether or not the first vertical sync signal has two different periods repeated alternately, and outputting the detection result as a decision signal; and a selector for receiving the first and second vertical sync signals, selecting the first vertical sync signal when the decision signal indicates that the first vertical sync signal has two different periods repeated alternately and otherwise selecting the second vertical sync signal, and outputting the selected signal, and when the rate at which the write address changes and the rate at which the read address changes are different from each other, the frame sync circuit controls the write into the frame memory or the read from the frame memory so that during read of a signal of a given frame from the frame memory, read of a signal of a frame other than the given frame caused by address overtaking does not occur.

5. The video signal processor of claim 4, wherein the frame sync circuit has at least two frame memories, and comprises:

a write control circuit for generating a write selection signal for selecting a frame memory into which a signal is written, from the two frame memories, and the write address for the selected frame memory, based on the output of the vertical sync signal generator, the horizontal sync signal and the write clock, and outputting the generated signal and address;

a read control circuit for counting the read clock, generating the read address for the two frame memories according to the resultant count value, and outputting the generated address; and a skip/hold control circuit for generating a skip/hold control signal for selecting a frame memory from which a signal is read, based on the trends of changes of the write address and the read address, and outputting the generated signal, and the frame sync circuit writes an input video signal into the frame memory selected with the write selection signal according to the write address, and also reads a signal from the frame memory selected with the skip/hold control signal according to the read address and outputs the signal as the standard video signal.

6. The video signal processor of claim 4, wherein the frame sync circuit comprises:

a line memory for delaying an input video signal by a time corresponding to a predetermined number of lines and outputting the delayed signal;

a write control circuit for generating the write address for the frame memory based on the output of the vertical sync signal generator, the horizontal sync signal and the write clock, and outputting the generated address;

a read control circuit for counting the read clock, generating the read address for the frame memory according to the resultant count value, and outputting the generated address; and a skip/hold control circuit for generating a skip/hold control signal for controlling so that either one of the input video signal and the output of the line memory is selected based on a difference between the write address and the read address and written into the frame memory, the frame sync circuit writes one of the input video signal and the output of the line memory selected with the skip/hold control signal into the frame memory according to the write address, and also reads a signal from the frame memory according to the read address and outputs the signal as the standard video signal.

7. The video signal processor of claim 4, further comprising:

a data multiplexer circuit for adding a data group representing a start mark, an end mark and a blanking time to data of each line of the standard video signal output from the frame sync circuit.

8. A vertical sync signal generator comprising:

a vertical sync signal separation circuit for separating a vertical sync signal of an input luminance signal and outputting the separated signal as a first vertical sync signal;

an automatic frequency control circuit for receiving the first vertical sync signal, generating a second vertical sync signal having a repeat frequency corresponding with an average repeat frequency of the first vertical sync signal and a phase error signal indicating a phase difference between the first vertical sync signal and the second vertical sync signal, and outputting the generated signals;

a vertical sync signal phase detection circuit for detecting whether or not the first vertical sync signal and the second vertical sync signal are out of phase with each other based on the phase error signal, and outputting the detection result as a decision signal; and a selector for receiving the first and second vertical sync signals, selecting the first vertical sync signal when the decision signal indicates that the first vertical sync signal and the second vertical sync signal are out of phase with each other and otherwise selecting the second vertical sync signal, and outputting the selected signal.

9. The vertical sync signal generator of claim 8, wherein the automatic frequency control circuit comprises:

an integrator circuit of m bits for accumulating input values;

a phase comparator circuit for sampling an output of the integrator circuit at a timing of the first vertical sync signal and outputting a difference between a sampled value and a predetermined value as the phase error signal;

a first low pass filter for allowing passing of a low-frequency component out of the phase error signal;

a second low pass filter for allowing passing of the low-frequency component and a component having a higher frequency than the low-frequency component out of the phase error signal;

a filter selector for selecting an output of the second low pass filter when the decision signal indicates that the first vertical sync signal and the second vertical sync signal are out of phase with each other and otherwise selecting an output of the first low pass filter, and outputting the selected signal;

an adder circuit for adding a constant to the output of the filter selector and outputting the result to the integrator circuit; and a differential circuit for differentiating the most significant bit of the integrator circuit and outputting the second vertical sync signal at a timing of the resultant edge.

10. The vertical sync signal generator of claim 8, wherein the vertical sync signal phase detection circuit comprises:

an absolute value circuit for obtaining an absolute value of the phase error signal and outputting the result;

a hold circuit for latching the output of the absolute value circuit at the timing of the first vertical sync signal, outputting the latched value, and holding the output until next latching;

a lockout comparator circuit for comparing the output of the hold circuit with a first constant and outputting the comparison result;

a lockout counter for counting the number of pulses of the first vertical sync signal when the output of the lockout comparator circuit indicates that the output of the absolute value circuit is equal to or larger than the first constant, and outputting the resultant count value;

a lockout decision circuit for outputting a lockout differential pulse when the count value of the lockout counter is equal to a second constant;

a lock-in comparator circuit for comparing the output of the hold circuit with a third constant and outputting the comparison result;

a lock-in counter for counting the number of pulses of the first vertical sync signal when the output of the lock-in comparator circuit indicates that the output of the absolute value circuit is equal to or smaller than the third constant, and outputting the resultant count value;

a lock-in decision circuit for outputting a lock-in differential pulse when the count value of the lock-in counter is equal to a fourth constant; and a logic circuit for outputting the decision signal indicating that the first vertical sync signal and the second vertical sync signal are out of phase with each other when the lockout decision circuit outputs the lockout differential pulse, and outputting the decision signal indicating that the first vertical sync signal and the second vertical sync signal are not out of phase with each other when the lock-in decision circuit outputs the lock-in differential pulse.

* * * * *

UNITED STATES PATENT AND TRADEMARK OFFICE
CERTIFICATE OF CORRECTION

PATENT NO. : 7,199,834 B2
APPLICATION NO. : 10/480235
DATED : April 3, 2007
INVENTOR(S) : Kunihiko Fujii et al.

It is certified that error appears in the above-identified patent and that said Letters Patent is hereby corrected as shown below:

On the title page,

Item (75), change:

" Kazuhide Fujimoto, Kawanishi (JP) " to -- Kazuhide Fujimoto, Hyogo (JP) --,
" Manabu Yumine, Kadoma (JP)" to -- Manabu Yumine, Osaka (JP) --,
" Toshiya Noritake, Daito (JP) " to -- Toshiya Noritake, Osaka (JP) --

Signed and Sealed this

Seventh Day of August, 2007

JON W. DUDAS
*Director of the United States Patent and Trademark Office*